(12) United States Patent
Wilhelmsson et al.

(10) Patent No.: US 11,855,785 B2
(45) Date of Patent: Dec. 26, 2023

(54) MULTI-LAYER HARQ TRANSMISSION TECHNIQUE

(71) Applicant: Telefonaktiebolaget LM Ericsson (publ), Stockholm (SE)

(72) Inventors: Leif Wilhelmsson, Lund (SE); Rocco Di Taranto, Lund (SE); Miguel Lopez, Solna (SE); Jung-Fu Cheng, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 185 days.

(21) Appl. No.: 17/428,432

(22) PCT Filed: Feb. 14, 2020

(86) PCT No.: PCT/EP2020/053926
§ 371 (c)(1),
(2) Date: Aug. 4, 2021

(87) PCT Pub. No.: WO2020/165421
PCT Pub. Date: Aug. 20, 2020

(65) Prior Publication Data
US 2022/0109530 A1    Apr. 7, 2022

Related U.S. Application Data

(60) Provisional application No. 62/899,044, filed on Sep. 11, 2019, provisional application No. 62/805,587, filed on Feb. 14, 2019.

(51) Int. Cl.
*H04L 1/18*      (2023.01)
*H04L 1/1825*   (2023.01)
(Continued)

(52) U.S. Cl.
CPC .......... *H04L 1/1825* (2013.01); *H04L 1/0003* (2013.01); *H04L 1/0009* (2013.01);
(Continued)

(58) Field of Classification Search
CPC ... H04L 1/1825; H04L 1/0003; H04L 1/0009; H04L 1/0086; H04L 1/1819;
(Continued)

(56) References Cited

U.S. PATENT DOCUMENTS 8,064,394 B2   11/2011   Jongren et al.
2007/0223422 A1*   9/2007   Kim ..................... H04B 7/0632
370/334

(Continued)

FOREIGN PATENT DOCUMENTS

EP      2424152 A1    2/2012
WO   2009129612 A1   10/2009
(Continued)

*Primary Examiner* — Steven Hieu D Nguyen
(74) *Attorney, Agent, or Firm* — COATS & BENNETT, PLLC

(57) ABSTRACT

A technique for performing a multi-layer transmission from a transmitting station to a receiving station on a radio frequency is described. The multi-layer transmission comprises multiple layers having different robustnesses (704, 706) on the radio frequency. As to a method aspect of the technique, first data of a first hybrid automatic repeat request, HARQ, process is transmitted on a first layer of the multi-layer transmission simultaneously with second data of a second HARQ process on a second layer of the multi-layer transmission.

19 Claims, 18 Drawing Sheets

300

Transmit, to a receiving station, first data of a first HARQ process on a first layer of a multi-layer transmission simultaneously with second data of a second HARQ process on a second layer of the multi-layer transmission, wherein a robustness of the first layer is different from a robustness of the second layer — 302

Receive a feedback message from the receiving station in response to the transmission, wherein optionally the robustness of at least one or each of the first layer and the second layer depends on or is changed responsive to the feedback message — 304

If the feedback message is indicative of a positive acknowledgment for the second data and not a positive acknowledgment for the first data, transmit, in response to the feedback message, the first data of the first HARQ process on the second layer simultaneously with third data transmitted on the first layer, or *vice versa*. — 306

(51) Int. Cl.
*H04L 1/00* (2006.01)
*H04L 1/1812* (2023.01)
*H04L 1/1822* (2023.01)
*H04L 1/1829* (2023.01)
*H04L 27/34* (2006.01)

(52) U.S. Cl.
CPC .......... *H04L 1/0086* (2013.01); *H04L 1/1819* (2013.01); *H04L 1/1822* (2013.01); *H04L 1/1845* (2013.01); *H04L 1/1864* (2013.01); *H04L 27/3405* (2013.01); *H04L 27/3488* (2013.01)

(58) Field of Classification Search
CPC ... H04L 1/1822; H04L 1/1845; H04L 1/1864; H04L 27/3405; H04L 27/3488
See application file for complete search history.

(56) References Cited

U.S. PATENT DOCUMENTS

| | | |
|---|---|---|
| 2008/0192718 A1 | 8/2008 | Jongren et al. |
| 2011/0033001 A1 | 2/2011 | Roh et al. |
| 2011/0080877 A1* | 4/2011 | Nentwig ............. H04W 52/262 370/329 |
| 2012/0082259 A1 | 4/2012 | Yue et al. |
| 2013/0010745 A1* | 1/2013 | Ko ....................... H04B 7/0617 370/329 |
| 2013/0242920 A1* | 9/2013 | Wang .................. H04W 72/542 370/329 |
| 2014/0044206 A1* | 2/2014 | Nammi ................ H04B 7/0417 375/267 |
| 2014/0247900 A1 | 9/2014 | Maes et al. |
| 2015/0098423 A1 | 4/2015 | Porat et al. |
| 2016/0204873 A1 | 7/2016 | Perez De Aranda Alonso et al. |
| 2017/0288936 A1 | 10/2017 | Park et al. |
| 2017/0339691 A1 | 11/2017 | ELArabawy et al. |
| 2018/0262382 A1 | 9/2018 | Manolakos et al. |

FOREIGN PATENT DOCUMENTS

| | | |
|---|---|---|
| WO | 2018009548 A1 | 1/2018 |
| WO | 2019192684 A1 | 10/2019 |

* cited by examiner

300

| Transmit, to a receiving station, first data of a first HARQ process on a first layer of a multi-layer transmission simultaneously with second data of a second HARQ process on a second layer of the multi-layer transmission, wherein a robustness of the first layer is different from a robustness of the second layer | — 302 |

| Receive a feedback message from the receiving station in response to the transmission, wherein optionally the robustness of at least one or each of the first layer and the second layer depends on or is changed responsive to the feedback message | — 304 |

| If the feedback message is indicative of a positive acknowledgment for the second data and not a positive acknowledgment for the first data, transmit, in response to the feedback message, the first data of the first HARQ process on the second layer simultaneously with third data transmitted on the first layer, or *vice versa*. | — 306 |

| Receive, from a transmitting station, first data of a first HARQ process on a first layer of a multi-layer transmission simultaneously with second data of a second HARQ process on a second layer of the multi-layer transmission, wherein a robustness of the first layer is different from a robustness of the second layer | — 402 |

| Transmit a feedback message to the transmitting station in response to the reception, wherein optionally the robustness of at least one or each of the first layer and the second layer depends on or is changed according to the feedback message | — 404 |

| If the feedback message is indicative of a positive acknowledgment for the second data and not a positive acknowledgment for the first data, receive, in response to the feedback message, the first data of the first HARQ process on the second layer simultaneously with third data transmitted on the first layer, or *vice versa*. | — 406 |

Fig. 4

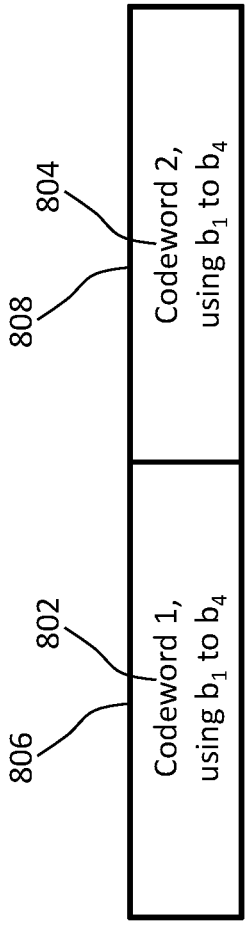
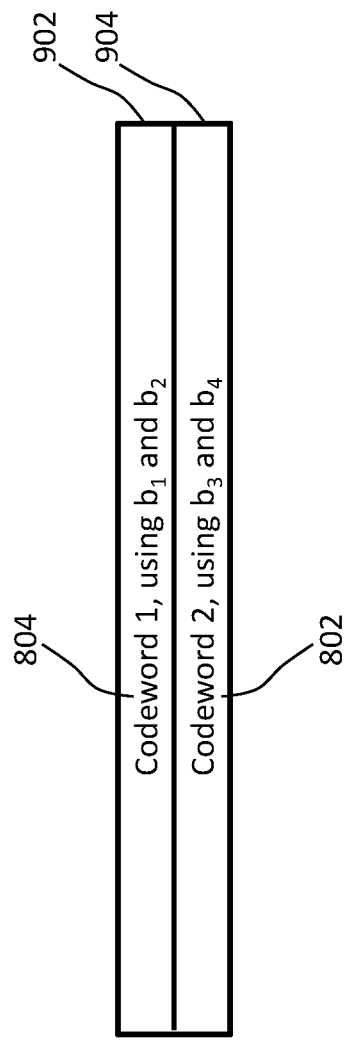
Fig. 8
Fig. 9

MULTI-LAYER HARQ TRANSMISSION TECHNIQUE

TECHNICAL FIELD

The present disclosure relates to a technique for multi-layer radio transmission. More specifically, and without limitation, methods and devices for performing a hybrid automatic repeat request (HARQ) transmission comprising multiple layers having different robustnesses are provided.

BACKGROUND

In an existing transmitter or transceiver, codewords from HARQ processes can be mapped or assigned to various layers in the sense of different spatial streams for transmission and/or retransmission of information on a radio channel. The document US 2008/0192718 A1 describes embodiments that provide for various mappings, which facilitate, for example, HARQ processes. For example, a codeword can be mapped onto a plurality of such spatial layers, which are equal in number to a channel rank of a radio channel to be used for the transmission.

Besides licensed radio bands, there is an increased interest in using unlicensed radio bands such as the industrial, scientific and medical (ISM) radio bands at 2.45 GHz and the 5 GHz radio bands for cellular and machine-type communications. To ensure co-existence between different radio devices using a certain standard as well as between radio devices using different standards, some kind of co-existence mechanism is employed for accessing such shared radio frequencies. One commonly used co-existence mechanism includes a listen-before-talk (LBT) procedure, which is also known as carrier sense multiple access with collision avoidance (CSMA/CA). Collisions are avoided by only initiating a transmission when the channel is not already used from the perspective of the potential transmitter. Effectively, a radio device that intends to transmit on the radio frequency senses the channel and determines whether the channel is busy (i.e., in use or occupied) or idle (i.e., unoccupied). If the channel is determined to be busy, the transmission is deferred, whereas if the channel is determined to be idle, the transmission is initiated. While CSMA/CA works well if interference at the transmitter and the receiver are correlated, it fails if the transmitter is out of the range of the interferer.

To counter the lack of knowledge as to interference and noise at the receiver, it is common practice to use forward error correction (FEC) codes in combination with an automatic retransmission request (ARQ) to ensure that the data is correctly received. By virtue of the FEC, the information to be transmitted is encoded so that the probability of a decoding error is decreased. In the event that a decoding error occurs, the receiver transmits a negative acknowledgement (NACK) to the transmitter, which triggers a retransmission of the erroneous packet in the sense of the ARQ. Combining FEC and ARQ is commonly referred to as hybrid ARQ (HARQ). The beneficial usage of HARQ is not limited to unlicensed bands.

Since a received packet contains some information about the transmitted data even if the data could not be correctly recovered from the packet, the receiver can combine the information obtained in the initial erroneous transmission with the additional information obtained in the retransmission. This will further enhance the performance, provided the information from the initial transmission is stored and later combined with the additional information obtained from the retransmission. In this way, the decoding error is less harmful and HARQ allows for a more opportunistic use of the channel between the transmitter and the receiver. That is, packets can be transmitted at a slightly higher data rate on average. For example, a modulation and coding rate can be higher when using HARQ compared to using ARQ.

However, when applying HARQ to an operation in unlicensed bands, aiming at a relatively high packet error ratio and relying on retransmissions may be problematic if the standard CSMA/CA protocol with exponential back-off is used, as an erroneously received packet means that the transmitter when accessing the channel for retransmission of a packet must double the size of its contention window (CW). Since this may severely degrade throughput and latency, especially in dense deployments, one may not be able to use opportunistic transmissions as desired and, thus, channel capacity is wasted.

Moreover, without limitation to an operation in unlicensed bands, every time a HARQ transmission or HARQ retransmission is correctly received, it is typically so that the channel would have allowed for even more data to be transmitted. Especially if the receiver was very close to decoding a packet correctly using the previous HARQ transmission, the HARQ retransmission of the packet carries more information than is actually needed for the correct decoding. Thus, channel capacity is wasted.

SUMMARY

Accordingly, there is a need for a HARQ radio communication technique that uses channel capacity more efficiently, especially in unlicensed radio frequency bands.

As to a first method aspect, a method of performing a multi-layer transmission from a transmitting station to a receiving station on a radio frequency is provided. The multi-layer transmission comprises multiple layers having different robustnesses on the radio frequency. The method comprises or initiates a step of transmitting first data of a first hybrid automatic repeat request (HARQ) process on a first layer of the multi-layer transmission simultaneously with second data of a second HARQ process on a second layer of the multi-layer transmission.

In at least some embodiments, the multi-layer transmission of data (e.g., data packets or pieces thereof) of different HARQ processes on different layers allows assigning specific portions of a mutual information or a channel capacity to the different HARQ processes, e.g., since the different layers have different robustnesses. The mutual information may be assigned to the different HARQ processes depending on a state of the respective HARQ process, e.g., since the respective data of different HARQ processes is transmitted in a layered fashion with different and/or varying robustnesses for the different layers. The state of the respective HARQ process may be the amount of outstanding information to successfully decode the data of the respective HARQ process at the receiving station.

Same or further embodiments may perform an opportunistic transmission on the radio frequency, e.g., without knowledge of a receiver channel condition at the time of formatting or initially transmitting the data packet, e.g., by trying to match the portion of information that is additionally required for successfully decoding the data packet to a specific layer of the multi-layer transmission that is expected to correspond to the required amount of additional information.

Herein, an opportunistic use of the radio frequency or an opportunistic transmission on the radio frequency may encompass transmitting data even if the data is not decoded correctly after the initial transmission, so that the initial transmission is still useful in providing some information that can be used for one or more successive (e.g., HARQ) re-transmissions. Alternatively or in addition, the transmission of data (e.g., a packet) may be opportunistic if under best or optimistic channel conditions the data is decodable, while these best or optimistic channel conditions are occasionally or intermittently not present. It may be still better on average to perform opportunistic transmission than using a more conservative or more robust modulation and coding scheme (MCS). Even if the best or optimistic channel conditions are not present (e.g., so that the packet will not be correctly decoded), the transmission still enables the receiver to extract some information so the cost for this not yet successful transmission is relatively low.

The different robustnesses of the multiple layers may correspond to different portions of a mutual information between the transmitting station and the receiving station. E.g., if the i-th layer (e.g., i=1, 2) of the multi-layer transmission corresponds to a mutual information of $x_i$ bits, the data of a HARQ process that requires y bits of additional information may be transmitted on the i-th layer with $y<x_i$. More specifically, the data of a HARQ process that requires y bits of additional information may be transmitted on the i-th layer with the least $x_i$ of all layers (e.g., among the first and second layers) fulfilling $y<x_i$. Using an hierarchical order of the layers of the multi-layer transmission, $x_i>x_{i+1}$, the data of a HARQ process that requires y bits of additional information may be transmitted on the i-th layer that fulfills $x_i>y>x_{i+1}$.

The technique may be implemented for the multi-layer transmission comprising two layers (i.e., the first and second layers) or more layers (e.g., a third layer or a fourth layer). The use of two or more layers may allow for a HARQ transmission from the transmitting station to the receiving station in which decoding of at least one of the multiple layers is successful. Consequently, there is no need to consider the transmission as erroneous or failed. Thus, no increase of a contention window (CW) is triggered, e.g., in case CSMA/CA (or any other co-existence mechanism for shared channel access) is used for accessing the radio frequency.

Alternatively or in addition, using two or more layers according to the technique may allow for an opportunistic transmission. For example, one layer (e.g., at least one layer and/or not all of the multiple layers) will not be decoded correctly and still carries information that is usable for a successive retransmission.

The radio frequency may be shared among a plurality of stations. Alternatively or in addition, the radio frequency may be in an unlicensed radio band.

The multi-layer transmission may contain at least two partial modulation symbols each associated with a different one of the multiple layers. The partial modulation symbols may be different in terms of power level or amplitude. The at least two partial modulation symbols may be combined into a modulation symbol that is transmitted in the multi-layer transmission.

A robustness of each of the multiple layers may be defined in terms of its power level or amplitude. For example, the robustness of a given layer may correspond to the (e.g., maximum or minimum) difference between modulation symbols representing different data on the given layer assuming all data on other layers is unchanged. The robustness of a respective layer of the multiple layers may correspond to a power level or amplitude used for the respective layer in the multi-layer transmission. The first layer may be the most robust layer of the multi-layer transmission, optionally with the exception of a layer dedicated to a control signal.

The transmitting station may perform the first method aspect. Alternatively or in addition, a system comprising the transmitting station and the receiving station may perform the method.

The multiple layers may also be referred to as multiple streams. The multi-layer transmission may be a multi-stream transmission.

The first data and the second data may be user data. The first and second data may be transmitted under the control of the first and second HARQ processes, respectively. The "first data of a first HARQ process" may be any data that is transmitted under the control of the first HARQ processes, and/or the "second data of a second HARQ process" may be any data that is transmitted under the control of the second HARQ processes.

The multiple layers may be transmitted on the same radio frequency. The different layers may be based on a power-level division. The multi-layer transmission may use power-level division multiplexing of the first data and the second data. The layers may be referred to as layers of a hierarchical modulation. The power-level division multiplexing may be combined with at least one of time division multiplexing, frequency division multiplexing and space division multiplexing, e.g., using an antenna array at each of the transmitting station and/or the receiving station, beamforming transmission at the transmitting station, diversity combining at the receiving station and/or a MIMO channel between transmitting station and the receiving station.

The multi-layer transmission may comprise one or more modulation symbols. More than one modulation symbol may be transmitted sequentially, e.g., in a transmission time interval (TTI) and/or a transmission opportunity (TxOp).

Each modulation symbol may be composed of multiple partial modulation symbols corresponding to the multiple layers, respectively. The different robustnesses of the multiple layers may be implemented by combining (e.g., superposing, superimposing or adding) the multiple partial modulation symbols. The partial modulation symbols may be combined into one modulation symbol. For example, the partial modulation symbols may be transmitted simultaneously on the radio frequency in the same spatial stream. The different partial modulation symbols may have the different robustnesses, respectively. For example, the robustnesses of the respective partial modulation symbol may be related to an amplitude of the respective partial modulation symbol.

Alternatively or in addition, each modulation symbol may be representative of a bit string comprising multiple (e.g., disjoint) groups of bits corresponding to the multiple layers, respectively. Different groups of bits may have the different robustnesses. The different robustnesses of the multiple layers may be implemented by mapping the bit string to the modulation symbol. A group of bits having more robustness may be mapped to more of the mutual information than a bit group having less robustness. By way of example, the modulation symbol may be representative of a bit string comprising 4 bits according to Gray-coded 16-QAM. Bits 1 and 2 of the bit string may have more robustness than bits 3 and 4.

Different modulation schemes (e.g., for the partial modulation symbols of different layers) and/or different coding schemes (e.g., for encoding the data of different layers) may be used for the first data and the second data according to the different layers, respectively. For example, the combination of the first data and the second data may determine the modulation symbol in a symbol alphabet. By way of example, a size of the symbol alphabet may be equal to $2^6=64$. The partial modulation symbols for one of the first and second layers may correspond to a first partial modulation alphabet (e.g., Quadrature Phase-Shift Keying, QPSK, with 4 partial constellations). The partial modulation symbols for another one of the first and second layers may correspond to a second partial modulation alphabet (e.g., quadrature amplitude modulation with 16 partial constellations, 16-QAM).

The step of combining (e.g., superposing or adding) may comprise determining or scaling an amplitude of the respective partial modulation symbols according to respective power levels. The different power levels may correspond to scaled partial modulation alphabets or scaled partial constellations. Alternatively or in addition, the combining (e.g., superposing, superimposing or adding) may correspond to the partial modulation alphabets or partial constellations being shifted in the constellation plane according to the partial modulation symbol of the next-higher layer of the multi-layer transmission.

The layers may be ordered according to the respective power levels (e.g., by the integer index). The amplitude of each pair of consecutive layers may be scaled by a factor of 2 or more, the power level of each pair of consecutive layers may be different by a factor of 4 or more and/or the power level of each pair of consecutive layers may be different by 6 dB or more.

Each partial modulation symbol may comprise at least one of a phase and an amplitude representing the first data and the second data, respectively. The modulation scheme may comprise a set of symbol candidates (i.e., the respective partial modulation alphabet) for the respective layer. The symbol candidates in the respective partial modulation alphabet may be different in terms of at least one of the phase and the amplitude.

The transmission of the first data on the first layer may be an initial transmission of the first HARQ process. The transmission of the second data on the second layer may be a retransmission of the second HARQ process. Alternatively or in addition, the transmission of the second data on the second layer may be an initial transmission of the second HARQ process. The transmission of the first data on the first layer may be a retransmission of the first HARQ process.

The retransmission of the first or second data may use a redundancy version (RV) that is different from an initial transmission of the respective data.

The method may further comprise or initiate a step of controlling the robustnesses of the multiple layers. For example, the robustnesses of the multiple layers may be controlled by assigning a first portion of a mutual information between the transmitting station and the receiving station to the first layer and assigning a second portion of the mutual information to the second layer. The mutual information between the transmitting station and the receiving station may be partitioned in a first portion or first robustness for the first layer and a second portion or second robustness for the second layer.

The robustnesses of the multiple layers may be controlled by considering the mutual information that can be expected to be carried by the first and second layers, respectively. A layer that carries enough information (e.g., enough mutual information, and preferably not much more than is needed) to successfully decode the respective data may be used for the respective data may be used for retransmitting the respective data. The mutual information that can be carried on a layer (i.e., the corresponding portion of the mutual information between the transmitter and the receiver) may be estimated based on a signal to noise ratio (SNR) and/or a signal to interference and noise ratio (SINR).

The mutual information between the transmitting station transmitting x and the receiving station receiving y may be defined by the respective probability distributions including the joint probability distribution $P_{XY}(x,y)$:

$$I(X;Y) = \sum_{x,y} P_{XY}(x,y) \log \frac{P_{XY}(x,y)}{P_X(x)P_Y(y)}$$

The marginal probability distribution $$P_X(x) = \sum_y P_{XY}(x,y)$$

for the input corresponds to a channel coding performed at the transmitting station. A channel capacity $$C = \max_{P_X} I(X;Y)$$

between the transmitting station and the receiving station is the maximum of the mutual information (asymptotically) achievable by channel coding.

The robustnesses of the different layers may be controlled by at least one parameter of a constellation or at least one parameter of a modulation and coding scheme (MCS).

The different robustnesses of the different layers may be controlled using the constellation or the MCS. The constellation or the MCS may assign different portions of the mutual information to the first layer and the second layer according to the respective robustnesses and/or the at least one parameter.

The first layer may be related to an in-phase component and the second layer may be related to a quadrature component in the multi-layer transmission. Alternatively or in addition, the second layer may be related to the in-phase component and the first layer may be related to a quadrature component in the multi-layer transmission. That is, the in-phase component may represent the first data and the quadrature component may represent the second data, or vice versa.

The method may further comprise or initiate a step of controlling the robustnesses of the first layer and the second layer by scaling at least one of the in-phase component and the quadrature component. The different robustnesses may be controlled by a ratio between the in-phase component for the first layer and the quadrature component for the second layer in the multi-layer transmission.

The in-phase component and the quadrature component are scaled oppositely. The different portions of the mutual information may be controlled by squeezing a constellation plane spanned by an in-phase component and a quadrature component of the modulation symbol.

The in-phase component may be scaled by a factor $\sin(\alpha)$ and the quadrature component may be scaled by a factor $\cos(\alpha)$ for a parameter $\alpha$ in $[0°, 45°]$ or $[0°, 90°]$, or vice versa, i.e., the functions sin and cos may be interchanged. The parameter $\alpha$ may be an example for the at least one parameter of the constellation or the MCS.

In other terms, a power level or signal to noise ratio (SNR) of the in-phase component may be scaled by a factor $(\sin(\alpha))^2$. A power level of the quadrature-phase component may be scaled by a factor $(\cos(\alpha))^2$. More specifically, the transmit power may be independent of the parameter $\alpha$.

The method may further comprise or initiate a step of receiving a feedback message from the receiving station in response to the transmission. The robustness of at least one or each of the first layer and the second layer may depend on or may be changed responsive to the feedback message. For example, the feedback message may request a change or may determine the partitioning of the mutual information or a change of the partitioning of the mutual information.

Moreover, changing the robustness of one or more of the layers (e.g., individually or differently for each layer) responsive to the feedback message may be implemented as a link adaptation. Changing the robustness of one or more of the layers may be implemented as a link adaptation that is specific for the one or more layers or specific for the one or more HARQ processes.

The feedback message may be indicative of a level of interference and/or noise at the receiving station or may comprise channel state information (CSI). The feedback message may be an acknowledgement frame, e.g., in response to the multi-layer transmission. The feedback message may relate to at least two or each of the multiple layers of the multi-layer transmission. For at least two or each of the multiple layers of the multi-layer transmission, the feedback message may be indicative of whether or not the respective data has been correctly decoded and/or the amount of information that is missing for the decoding. The feedback message may comprise a Block Acknowledgment (BA).

The feedback message may be indicative of a signal to a SNR or a SINR. The method may further comprise or initiate a step of assigning a first portion of a mutual information (between the transmitting station and the receiving station) to the first layer and/or assigning a second portion of the mutual information to the second layer. The portions of the mutual information may be estimated based on the indicated SNR and/or SINR to correspond to the amount of information that is missing to successfully decode at least one or each of the first data and the second data.

The robustness of the first layer and the robustness of the second layer may be changed oppositely depending on the feedback message from the receiving station. For example, the robustness of one of the layers may be increased and the robustness of another or the other of the layers may be decreased depending on the feedback message.

The feedback message may be received responsive to the multi-layer transmission from the transmitting station to the receiving station.

For example, the robustness of the first layer may be increased and the robustness of the second layer may be decreased depending on the feedback message from the receiving station, or vice versa. The feedback message may comprise or be indicative of the parameter $\alpha$. The robustnesses of the first and second layers may be scaled by the factors $\sin(\alpha)$ and $\cos(\alpha)$, respectively, for a parameter $\alpha$ in $[0°, 45°]$ or $[0°, 90°]$.

The feedback message may be indicative of how close the receiving station is to successfully (i.e., correctly) decoding at least one or each of the first data and the second data.

The feedback message may be indicative of one or more robustnesses to be used for retransmitting at least one or each of the first data and the second data.

The feedback message may comprise a soft acknowledgment that is indicative of a state between a positive acknowledgment and a negative acknowledgment for at least one or each of the first data and the second data.

The positive acknowledgment may be indicative of successfully (i.e., correctly) decoding the respective data. Each of the first data and the second data may be protected by a respective CRC value. Based on the CRC value, the receiving station may determine whether or not the deciding is correct.

The receiver may estimate how close it is to correctly decoding (or how far it was from failing), e.g. by estimating a metric relevant for the decoding. The data on each layer may be protected by multiple CRCs for disjoint portions of the data, so that the receiver may estimate how close it is to successfully decoding based on the fraction of positive CRCs. Alternatively or in addition, the metric may be a function of the SNR or SINR. Alternatively or in addition, using certain decoding algorithms, the receiver may determine how close it was that another decoding decision was made. By checking a parity equation, the receiver may derive the metric from soft values for the bits.

A mapping of at least one of the first data and the second data to the first layer and the second layer may depend on or may be changed responsive to the feedback message.

The method may further comprise or initiate a step of mapping the first data to one of the layers in a further transmission, if the feedback message is indicative that decoding of the first data was not successful by an amount of missing information. A portion of mutual information carried by the one layer in the further transmission may be greater than the indicated amount of missing information. More specifically, the first data may be mapped to the one layer having the least robustness or the least portion of mutual information among the layers carrying a portion of mutual information greater than the indicated amount of missing information.

The feedback message may be indicative of a positive acknowledgment for the second data and not a positive acknowledgment for the first data. The method may further comprise or initiate a step of transmitting, to the receiving station in response to the feedback message, the first data of the first HARQ process. The first data may be transmitted on the second layer simultaneously with third data transmitted on the first layer, or vice versa.

Responsive to the feedback, the first data may be transmitted (i.e., retransmitted) in a further multi-layer transmission on the second layer. The first data may be transmitted in a further multi-layer transmission on the second layer using a redundancy version (RV) other than the RV previously used in the multi-layer transmission of the first data on the first layer. The transmission of the third data on the first layer may be an initial transmission, e.g., of the first or second HARQ process.

The radio frequency may be shared, e.g., among a plurality of stations including the transmitting station and the receiving station.

The feedback message may be indicative of a positive acknowledgment for the first data and not a positive acknowledgment for the second data. The method may further comprise or initiate a step of transmitting, to the receiving station in response to the feedback message, the second data of the second HARQ process. The second data may be transmitted on the first layer simultaneously with third data transmitted on the second layer or vice versa.

The method may further comprise or initiate transmitting the first data on the second layer, if the feedback message is indicative that decoding of the first data was not successful and if the portion of mutual information carried by the second layer is sufficient (or estimated to be sufficient) for successfully decoding the first data.

The multi-layer transmission on the radio frequency may be subject to an access protocol for shared access to the radio frequency. The access protocol may comprise or perform at least one of a co-existence mechanism; a shared channel access; statistical time-division multiplexing; a distributed random access scheme for collision avoidance; a distributed collision avoidance channel access; a distributed channel access (DCA); a contention procedure; a listen before talk (LBT) procedure, e.g., according to the Third Generation Partnership Project (3GPP); and a Carrier Sense Multiple Access with Collision Avoidance (CSMA/CA), e.g., according to the standard family IEEE 802.11. Optionally, the HARQ processes may be mapped to the layers according to an access class of the respective data, e.g., according to the standard IEEE 802.11e.

A successful contention according to the access protocol may enable the transmitting station to perform the multi-layer transmission in a transmission opportunity. Optionally, each HARQ process may perform its own contention procedure. The successful contention of at least one of the HARQ processes may trigger the multi-layer transmission. The transmission opportunity may be any time period in which a station is permitted to transmit, e.g., as a result of the successful contention procedure. For example and without limitation thereto, the transmission opportunity may be a parameter TxOp defined by the standard family IEEE 802.11 or 3GPP Release 13 (or later).

The access protocol may comprise a back-off mechanism for deferring the multi-layer transmission based on a contention window. The contention window may be maintained or not increased if the feedback message from the receiving station is indicative of a positive acknowledgement for at least one of the first data and the second data.

The contention window may be increased (e.g., doubled in size) if (e.g., only if) the feedback message from the receiving station is indicative of a negative acknowledgement for both the first data and the second data. The contention window may be increased if (e.g., only if) the feedback message is indicative of a negative acknowledgement for all of the multiple layers.

The access protocol performed by the transmitting station may be based on a back-off counter. The back-off counter may also be referred to as a slot counter. The access protocol performed by the transmitting station may be initialized by randomly drawing a value for the back-off counter from the contention window, e.g., an initial contention window.

If the radio frequency is idle (i.e., unoccupied) for a predefined or configured time period (e.g., a slot or a distributed inter-frame spacing, DIFS) the back-off counter may be decremented (e.g., for each idle slot or idle DIFS). The success of the contention procedure may be defined by a vanishing (i.e., zero) back-off counter at the transmission opportunity (e.g., at the start of the transmission opportunity). The access protocol may enable the multi-layer transmission as soon as the back-off counter is zero. As long as the back-off counter is positive, the access protocol may prevent to the transmitting station from transmitting on the radio frequency.

Multiple codewords for the multiple layers, respectively, may be encoded. Each codeword for the individual layer may further incorporate a cyclic redundancy check (CRC) to verify at the receiving station whether the respective codeword is decoded successfully. When at least one of the codewords is decoded successfully, soft values for the one or more other codewords may be computed using the successfully decoded codeword as additional information.

As to a second method aspect, a method of performing a multi-layer reception from a transmitting station at a receiving station on a radio frequency is provided. The multi-layer reception comprises multiple layers having different robustnesses on the radio frequency. The method comprises or initiates a step of receiving first data of a first hybrid automatic repeat request (HARQ) process on a first layer of the multi-layer transmission simultaneously with second data of a second HARQ process on a second layer of the multi-layer reception.

Herein, "receiving" the first or second data may encompass receiving a radio signal carrying the respective data. The received data may or may not be correctly decoded or decodable.

Performing the multi-layer reception may also be referred to as receiving a multi-layer transmission, e.g., the multi-layer transmission of the first method aspect.

The receiving station may perform the second method aspect. Alternatively or in addition, a system comprising the transmitting station and the receiving station may perform the method.

The second method aspect may further comprise any feature and any step disclosed in the context of the first method aspect, or a feature or step corresponding thereto, e.g., a receiver counterpart to a transmitter feature or step.

In any aspect, the technique may be implemented as a multi-layer HARQ technique. The technique of performing a multi-layer transmission from a transmitting station to a receiving station on a radio frequency using HARQ on at least one layer may also be referred to as a multi-layer HARQ transmission. Analogously, the technique of performing a multi-layer reception may also be referred to as a multi-layer reception. The technique of performing a multi-layer reception from a transmitting station at a receiving station on a radio frequency using HARQ on at least one layer may also be referred to as a multi-layer HARQ reception. Receiving a retransmission may also be referred to as a re-reception.

The multi-layer transmission from the transmitting station may be received by one or more receiving stations on the radio frequency. Any one of the transmitting station and the one or more receiving stations may be a radio device or a base station.

The first method aspect may be performed at or by the transmitting station (briefly: transmitter). The transmitting station may be a base station, e.g., for a downlink or a backhaul link using the radio frequency. Alternatively or in addition, the transmitting station may be a radio device, e.g., for an uplink or a sidelink using the radio frequency. The second method aspect may be performed at or by the receiving station (briefly: receiver). The receiving station may be a base station, e.g., terminating the backhaul link or the uplink. Alternatively or in addition, the receiving station may be a radio device, e.g., terminating the downlink or the sidelink.

The step of transmitting may comprise generating the modulation symbol by combining the partial modulation symbols of the respective layers, e.g., in a constellation plane or by superposing in-phase (I) and quadrature (Q) components, respectively, of all partial modulation symbols. The partial modulation symbols may be combined by determining and/or scaling an amplitude of the partial modulation symbol according to a power level of the respective layer. The different power levels may correspond to scaled modulation alphabets or scaled constellation diagrams. Alternatively or in addition, the combining may correspond to modulation alphabets or constellation diagrams shifted in the constellation plane according to the partial modulation symbol of the next higher layer.

In any aspect, the layers may be ordered according to the respective power levels. The amplitude of each pair of consecutive layers may be scaled by a factor of 2 or more. The power of each pair of consecutive layers may be different by a factor of 4 or more and/or the power level of each pair of consecutive layers may be different by 6 dB or more.

A channel used for the multi-layer transmission, e.g., the channel between the transmitting station and the receiving station, may comprise multiple subcarriers in a frequency domain. The radio frequency may correspond to one of the subcarriers or each of the subcarriers may be an example for the radio frequency. Alternatively, or in addition, the channel may comprise one or more slots or transmission time intervals (TTIs). Each slot or TTI may comprise one or a plurality of modulation symbols in a time domain. Alternatively, or in addition, the channel may comprise a directional transmission (also: beamforming transmission) at the transmitting station, a directional reception (also: beamforming reception) at the receiving station or a multiple-input multiple-output (MIMO) channel with two or more spatial streams (as a spatial domain). Each method aspect or at least the multi-layer transmission and the multi-layer reception may be performed for each of the subcarriers, the slots, TTIs or modulation symbols, and/or the spatial streams.

The transmitting station and/or the receiving station may form, or may be part of, a radio network, e.g., according to the Third Generation Partnership Project (3GPP) or according to the standard family IEEE 802.11 (Wi-Fi). The first and second method aspects may be performed by one or more embodiments of the transmitting and receiving stations, respectively, in the radio network. The radio network may be a radio access network (RAN). The RAN may comprise one or more base stations, e.g., acting as the transmitting or receiving station. Alternatively or in addition, the radio network may be a vehicular, ad hoc and/or mesh network comprising two or more radio devices, e.g., acting as the transmitting and receiving stations.

Any of the radio devices may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Any of the radio devices may be wirelessly connected or connectable (e.g., according to a radio resource control, RRC, state or active mode) with any of the base stations.

The base station may encompass any station that is configured to provide radio access to any of the radio devices. The base stations may also be referred to as transmission and reception point (TRP), radio access node or access point (AP). The base station or one of the radio devices functioning as a gateway (e.g., between the radio network and the RAN and/or the Internet) may provide a data link to a host computer providing the first and/or second data. Examples for the base stations may include a 3G base station or Node B, 4G base station or eNodeB, a 5G base station or gNodeB, a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer and/or a Radio Resource Control (RRC) layer of a protocol stack for the radio communication.

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a device for performing a multi-layer transmission from a transmitting station to a receiving station on a radio frequency is provided. The multi-layer transmission comprises multiple layers having different robustnesses on the radio frequency. The device may be configured to perform any one of the steps of the first method aspect.

As to a second device aspect, a device for performing a multi-layer reception from a transmitting station at a receiving station on a radio frequency is provided. The multi-layer transmission comprises multiple layers having different robustnesses on the radio frequency. The device may be configured to perform any one of the steps of the second method aspect.

As to a further first device aspect, a device for performing a multi-layer transmission from a transmitting station to a receiving station on a radio frequency is provided. The device comprises at least one processor and a memory. Said memory comprises instructions executable by said at least one processor whereby the device is operative to perform any one of the steps of the first method aspect.

As to a further second device aspect, a device for performing a multi-layer reception from a transmitting station at a receiving station on a radio frequency is provided. The device comprises at least one processor and a memory. Said memory comprises instructions executable by said at least one processor whereby the device is operative to perform any one of the steps of the second method aspect.

As to a still further aspect a communication system including a host computer is provided. The host computer comprises a processing circuitry configured to provide user data, e.g., included in the first and/or second data of the multi-layer transmission. The host computer further comprises a communication interface configured to forward the first and/or second data to a cellular network (e.g., the RAN and/or the base station) for transmission to a UE. A processing circuitry of the cellular network is configured to execute any one of the steps of the first and/or second method aspects. The UE comprises a radio interface and processing circuitry, which is configured to execute any one of the steps of the first and/or second method aspects.

The communication system may further include the UE. Alternatively, or in addition, the cellular network may further include one or more base stations configured for a radio communication with the UE and/or to provide a data link between the UE and the host computer using the first and/or second method aspects.

The processing circuitry of the host computer may be configured to execute a host application, thereby providing the first and/or second data and/or any host computer functionality described herein. Alternatively, or in addition, the processing circuitry of the UE may be configured to execute a client application associated with the host application.

Any one of the devices, the UE, the base station, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein:

FIG. 3 shows a flowchart for a method of performing a multi-layer transmission, which method may be implementable by the device of FIG. 1;

FIG. 4 shows a flowchart for a method of performing a multi-layer reception, which method may be implementable by the device of FIG. 2;

FIG. 8 schematically illustrates a comparative example that maps one codeword to one modulation symbol;

FIG. 9 schematically illustrates an embodiment that maps two codewords to two layers, respectively;

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Wireless Local Area Network (WLAN) implementation according to the standard family IEEE 802.11, it is readily apparent that the technique described herein may also be implemented for any other radio communication technique, including a New Radio (NR) or 5G implementation, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
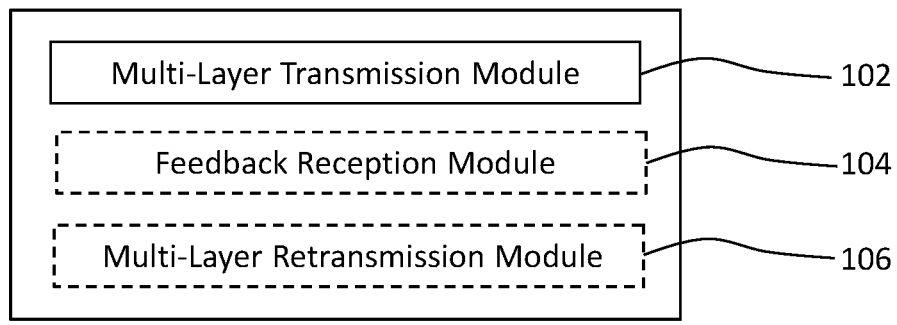
FIG. 1 shows a schematic block diagram of an embodiment of a device for performing a multi-layer transmission.

FIG. 1 schematically illustrates a block diagram of an embodiment of a device for performing a multi-layer transmission from a transmitting station to a receiving station on a radio frequency. The multi-layer transmission comprises multiple layers having different robustnesses on the radio frequency. The device is generically referred to by reference sign 100.

The device 100 comprises a multi-layer transmission module 102 that transmits first data of a first hybrid automatic repeat request (HARQ) process on a first layer of the multi-layer transmission simultaneously with second data of a second HARQ process on a second layer of the multi-layer transmission.

Optionally, the device 100 comprises a feedback reception module 104 that receives a feedback message from the receiving station in response to the transmission.

In a first variant, in case the feedback message is indicative of a positive acknowledgment for the second data and not a positive acknowledgment for the first data, an optional multi-layer retransmission module 106 transmits, to the receiving station in response to the feedback message, the first data of the first HARQ process, e.g., on the second layer simultaneously with third data transmitted on the first layer or vice versa. In a second variant, which may be implemented in combination with the first variant, in case the feedback message is indicative of a positive acknowledgment for the first data and not a positive acknowledgment for the second data, the multi-layer retransmission module 106 transmits, to the receiving station in response to the feedback message, the second data of the second HARQ process, e.g., on the first layer simultaneously with third data transmitted on the second layer or vice versa.

Any of the modules of the device 100 may be implemented by units configured to provide the corresponding functionality.

The device 100 may also be referred to as, or may be embodied by, the transmitting station (or briefly: transmitter). The transmitting station 100 and the receiving station may be in direct radio communication, e.g., at least for the multi-layer transmission from the transmitting station 100 to the receiving station. The receiving station may be embodied by the device 200.

Figure 2:
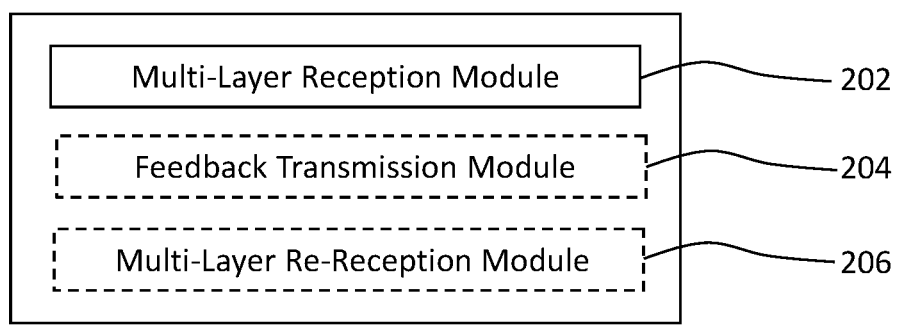
FIG. 2 shows a schematic block diagram of an embodiment of a device for performing a multi-layer reception.

FIG. 2 schematically illustrates a block diagram of an embodiment of a device for performing a multi-layer reception from a transmitting station at a receiving station on a radio frequency. The multi-layer reception comprises multiple layers having different robustnesses on the radio frequency. The device is generically referred to by reference sign 200. Performing a multi-layer reception is also referred to as receiving a multi-layer transmission.

The device 200 comprises a multi-layer reception module 202 that receives first data of a first HARQ process on a first layer of the multi-layer reception simultaneously with second data of a second HARQ process on a second layer of the multi-layer reception.

Optionally, the device 200 comprises a feedback transmission module 204 that transmits a feedback message to the transmitting station in response to the reception.

In a first variant, in case the feedback message is indicative of a positive acknowledgment for the second data and not a positive acknowledgment for the first data, an optional multi-layer re-reception module 206 receives, from the transmitting station in response to the feedback message, the first data of the first HARQ process, e.g., on the second layer simultaneously with third data transmitted on the first layer or vice versa. In a second variant, which may be implemented in combination with the first variant, in case the feedback message is indicative of a positive acknowledgment for the first data and not a positive acknowledgment for the second data, the multi-layer re-reception module 206 receives, from the transmitting station in response to the feedback message, the second data of the second HARQ process, e.g., on the first layer simultaneously with third data transmitted on the second layer or vice versa.

Any of the modules of the device 200 may be implemented by units configured to provide the corresponding functionality.

The device 200 may also be referred to as, or may be embodied by, the receiving station (or briefly: receiver). The transmitting station and the receiving station 200 may be in direct radio communication, e.g., at least for the multi-layer reception from the transmitting station to the receiving station 200. The transmitting station may be embodied by the device 100.

FIG. 3 shows an example flowchart for a method 300 of performing a multi-layer transmission from a transmitting station to a receiving station on a radio frequency. The multi-layer transmission comprises multiple layers having different robustnesses on the radio frequency. In a step 302, first data of a first HARQ process is transmitted on a first layer of the multi-layer transmission. Second data of a second HARQ process is transmitted on a second layer of the multi-layer transmission simultaneously with the first data on the first layer. For example, the robustness of the first layer is greater than the robustness of the second layer.

Optionally, in a step 304, a feedback message is received from the receiving station in response to the transmission 302. The robustness of at least one or each of the first layer and the second layer may depend on or be changed responsive to the feedback message.

In an optional step 306, according to a first variant, if the feedback message is indicative of a positive acknowledgment for the second data and not a positive acknowledgment for the first data, the first data of the first HARQ process is transmitted on the second layer simultaneously with third data transmitted on the first layer, or vice versa, in response to the feedback message. That is, the first data is retransmitted, e.g., either on a layer that is different from the layer used in the initial transmission 302 of the first data or on the same layer. The selection of the layer for retransmitting the first data in the step 306 may depend on a state of the first HARQ process and/or the feedback message, e.g., the amount of missing information for correctly decoding the first data. Furthermore, the transmission of the second data in the step 302 may be a retransmission of the second data, e.g., after a previous multi-layer transmission that initially transmitted the second data.

According to a second variant of the step 306, which is implementable together with the first variant, if the feedback message is indicative of a positive acknowledgment for the first data and not a positive acknowledgment for the second data, the second data of the second HARQ process is transmitted on the first layer simultaneously with third data transmitted on the second layer, or vice versa, in response to the feedback message. That is, the second data is retransmitted, e.g., either on a layer that is different from the layer used in the initial transmission 302 of the second data or on the same layer. The selection of the layer for retransmitting the second data in the step 306 may depend on a state of the second HARQ process and/or the feedback message, e.g., the amount of missing information for correctly decoding the second data. Furthermore, the transmission of the first data in the step 302 may be a retransmission of the first data, e.g., after a previous multi-layer transmission that initially transmitted the first data.

The method 300 may be performed by the device 100. For example, the modules 102, 104 and 106 may perform the steps 302, 304 and 306, respectively.

FIG. 4 shows an example flowchart for a method 400 of performing a multi-layer reception from a transmitting station at a receiving station on a radio frequency. The multi-layer reception comprises multiple layers having different robustnesses on the radio frequency. In a step 402, first data of a first HARQ process is received on a first layer of the multi-layer reception. Second data of a second HARQ process is received on a second layer of the multi-layer reception simultaneously with the first data on the first layer. For example, the robustness of the first layer is greater than the robustness of the second layer.

Optionally, in a step 404, a feedback message is transmitted to the transmitting station in response to the reception 402. The robustness of at least one or each of the first layer and the second layer may depend on or be changed responsive to the feedback message.

In an optional step 406, according to a first variant, if the feedback message is indicative of a positive acknowledgment for the second data and not a positive acknowledgment for the first data, the first data of the first HARQ process is received on the second layer simultaneously with third data received on the first layer, or vice versa, in response to the feedback message. That is, the first data is received in a retransmission of the first data, e.g., either on a layer that is different from the layer used in the initial reception 402 of the first data or on the same layer. The selection of the layer for the re-reception of the first data in the step 406 may depend on a state of the first HARQ process and/or the feedback message, e.g., the amount of missing information for correctly decoding the first data. Furthermore, the second data received in the step 402 may be received as a retransmission of the second data, e.g., after a previous multi-layer reception.

According to a second variant of the step 406, which is implementable together with the first variant, if the feedback message is indicative of a positive acknowledgment for the first data and not a positive acknowledgment for the second data, the second data of the second HARQ process is received on the first layer simultaneously with third data transmitted on the second layer, or vice versa, in response to the feedback message. That is, the second data is received in a retransmission, e.g., either on a layer that is different from the layer used in the initial reception 402 of the second data or on the same layer. The selection of the layer for the re-reception of the second data in the step 406 may depend on a state of the second HARQ process and/or the feedback message, e.g., the amount of missing information for correctly decoding the second data. Furthermore, the first data received in the step 402 may be received as a retransmission of the first data, e.g., after a previous multi-layer reception.

The method 400 may be performed by the device 200. For example, the modules 202, 204 and 206 may perform the steps 402, 404 and 406, respectively.

In any aspect, the data of the respective HARQ process transmitted on the respective layer may be a message or a data packet.

The technique may be applied to uplink (UL), downlink (DL) or direct communications between radio devices, e.g., device-to-device (D2D) communications or sidelink (SL) communications.

Each of the transmitting station 100 and receiving station 200 may be a radio device or a base station. Herein, any radio device may be a mobile or portable station and/or any radio device wirelessly connectable to a base station or RAN, or to another radio device. For example, the radio device may be a user equipment (UE), a device for machine-type communication (MTC) or a device for (e.g., narrow-band) Internet of Things (IoT). Two or more radio devices may be configured to wirelessly connect to each other, e.g., in an ad hoc radio network or via a 3GPP SL connection. Furthermore, any base station may be a station providing radio access, may be part of a radio access network (RAN) and/or may be a node connected to the RAN for controlling the radio access. For example, the base station may be an access point, for example a Wi-Fi access point.

Each of the HARQ processes may be implemented according to at least one of chase combining (CC) and incremental redundancy (IR). In CC, the non-correctly received data (e.g., a data packet) is retransmitted and by combining two or more versions of the respective data (e.g., of the data packet) in the receiver 200, an energy gain is effectively obtained leading to improved performance. In IR, additional parity bits are transmitted in subsequent transmissions leading to that in addition to an energy gain there will also be a coding gain. Typically, IR is based on that the original code (e.g., the channel code used for encoding the data to be transmitted) is of a relative low rate, e.g., ¼. Each retransmission adds more and more parity bits successively, e.g., as long as the codeword is not correctly decoded according to the feedback message.

One of the advantages of using HARQ instead of ARQ is that in case of an erroneous transmission, there is still some useful information transmitted from the transmitter 100 to the receiver 200 that can be used in the subsequent decoding (e.g., after the retransmission). Since a decoding error (e.g., of the first data) in this way is less harmful, embodiments of the technique allow for a more opportunistic use of the channel, i.e., the radio frequency. That is, the data (e.g., data packets) can be transmitted at a higher data rate on average.

In an embodiment of the transmitting station 100, the respective data is stored, e.g., as codewords, in a plurality of HARQ queues, which are mapped to the respective layers. In an embodiment of the receiving station 200, the respective data is stored, e.g., as soft bits, in a plurality of HARQ queues, which are fed from the respective layers.

Herein, whenever referring to noise or a signal-to-noise ratio (SNR), a corresponding step, feature or effect is also disclosed for noise and/or interference or a signal-to-interference-and-noise ratio (SINR).

In any embodiment, the radio frequency is optionally shared or unlicensed. While an access protocol (i.e., a co-existence mechanism) for shared access to the radio frequency (i.e., shared channel access) can reduce an amount of collisions, there are many situations, in which the conventional co-existence mechanism does not work very well. Specifically, since a listen-before-talk (LBT) operation is performed by the device intended to initiate a transmission, i.e., the transmitter 100, the knowledge of the interference conditions at the device intended for the reception, i.e., the receiver 200, may largely be unknown.

Figure 5:
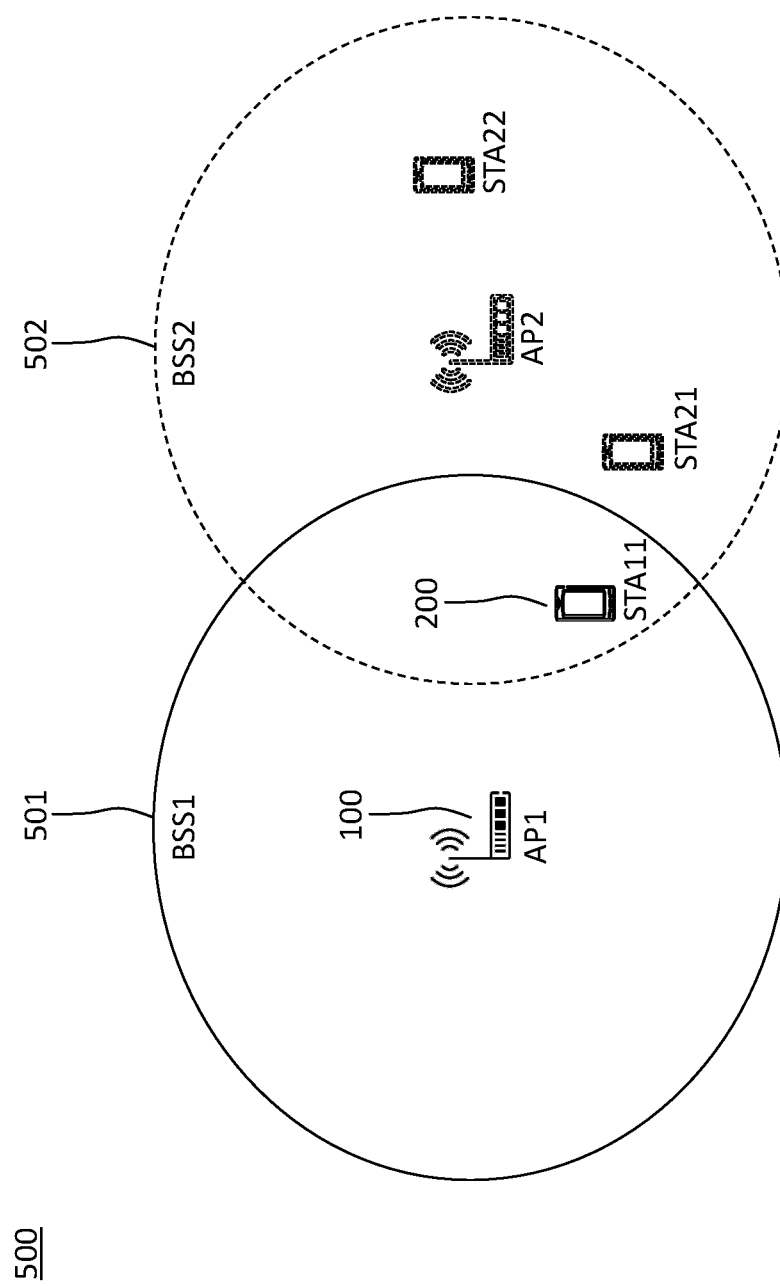
FIG. 5 schematically illustrates an exemplary network environment for implementing the devices of FIGS. 1 and 2.

FIG. 5 schematically illustrates how the receiver 200 may experience interference conditions that are very different from interference conditions at the transmitter 100. More specifically, an example network environment 500 for unknown receiver conditions is illustrated in FIG. 5.

An Access Point 1 (AP1) embodies the transmitter 100. The AP1 may serve a Basic Service Set 1 (BSS1) within the range indicated at reference sign 501. The AP1 is, in the exemplary situation, not within a coverage area 502 of any of the stations belonging to a Basic Service Set 2 (BSS2), so if AP1 has data to send to Station 11 (STA11) embodying the receiver 200, it will initiate a transmission.

However, the receiver conditions at STA11 will severely depend on if or what transmissions are ongoing in the BSS2.

If the STA22 is transmitting, this may not impact a transmission to STA11 at all, whereas if the STA21 is transmitting a transmission to STA11 may most likely not be correctly received. If the AP2 is transmitting, the outcome may in fact depend on to which station the AP2 is transmitting. For example, if the AP2 uses a directional transmission towards the STA22, little interference may be experienced at the STA11.

At an embodiment of the transmitter 100, the typical procedure when transmitting information in the steps 302 and 306 is that the information is encoded by an error correcting encoder, and then the coded bits (e.g., the codeword) are modulated using a suitable modulation format. The error correcting code may for instance be a binary convolution code (BCC) or a low density parity check (LDPC) code. Alternatively or in combination, the modulation may for instance be phase shift keying (PSK) or M-ary quadrature amplitude modulation (M-QAM).

The receiver 200 then tries to decode the information (i.e., the respective data received on the respective layer) by essentially doing the reversed operations. First the received signal is demodulated, i.e., soft information for the bits (briefly:

soft bits) are extracted from the received modulation symbol (e.g., out of M-ary symbols defining a modulation alphabet of size M). The soft information is then fed to the decoder for decoding the information (i.e., the respective data).

When non-binary modulation is used, $\log_2(M)$ bits are mapped on each M-ary modulation symbol. This mapping can in principle be done in many ways, but typically so-called Gray mapping is used. In Gray mapping, the bit-pattern for two adjacent constellation points only differ in one position (e.g., in one bit of the bit string representing the codeword).

Figure 6:
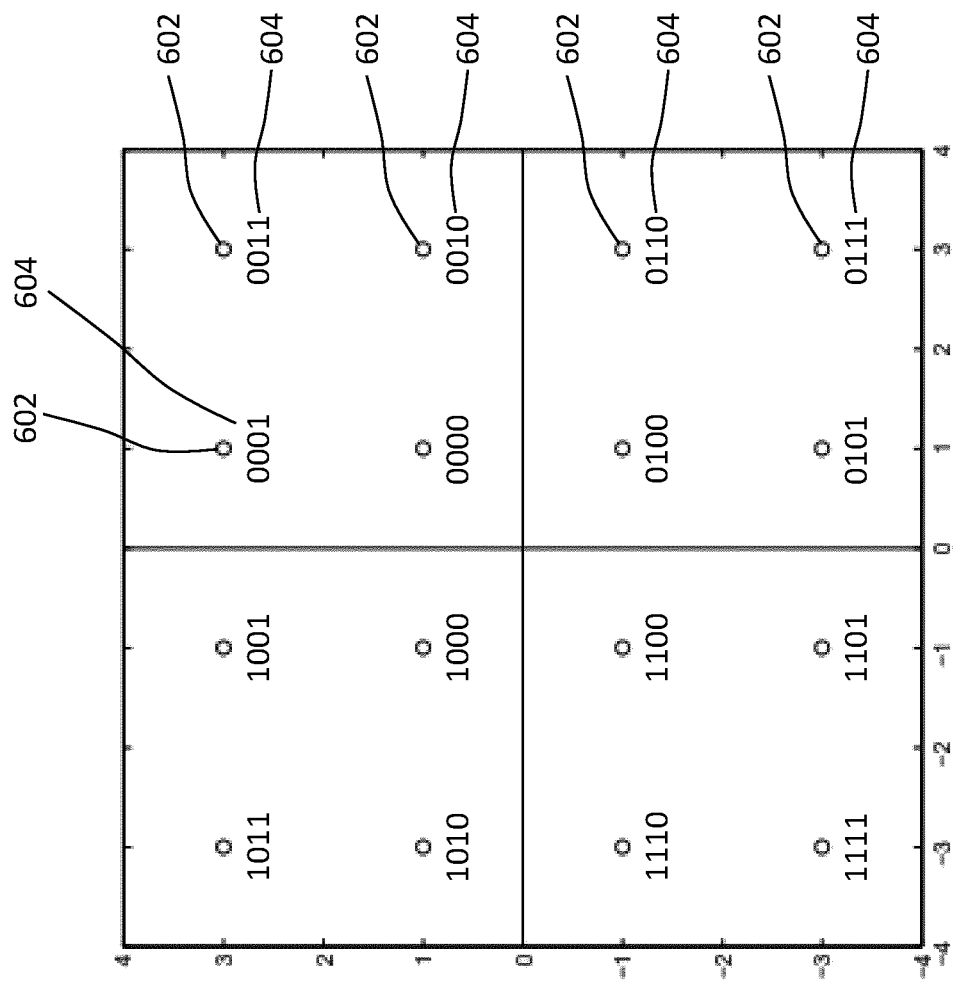
FIG. 6 schematically illustrates an exemplary constellation diagram for a multi-layer transmission.

FIG. 6 schematically illustrates a constellation diagram 600 of a Gray mapping for 16-QAM. Even if a modulation symbol 602 is in error, not all of the different bits 604 represented by the respective modulation symbol 602 are in error. Examining the mapping a bit closer, it can be observed that the first bit determines whether the 16-QAM symbol 602 is to the right or to the left of the imaginary axis (i.e., the quadrature-phase axis of the constellation diagram 600). The second bit determines whether the 16-QAM symbol 602 is above or below the real axis (i.e., the in-phase axis of the constellation diagram 600). The third bit determines whether the 16-QAM symbol 602 is in the inner two columns, i.e., the two columns closest to the imaginary axis, and the fourth bit determines whether the 16-QAM symbol 602 is in the inner two rows, i.e., the two rows closest to the real axis.

Using information theoretical arguments, it can be shown that bits 1 and 2 carry more information (e.g., a greater portion of the mutual information between the transmitter 100 and the receiver 200) than bits 3 and 4. The total information (e.g., the mutual information) transmitted in a corresponding implementation of the step 302 and 306 is the sum of the information transmitted by the four bits.

Figure 7:
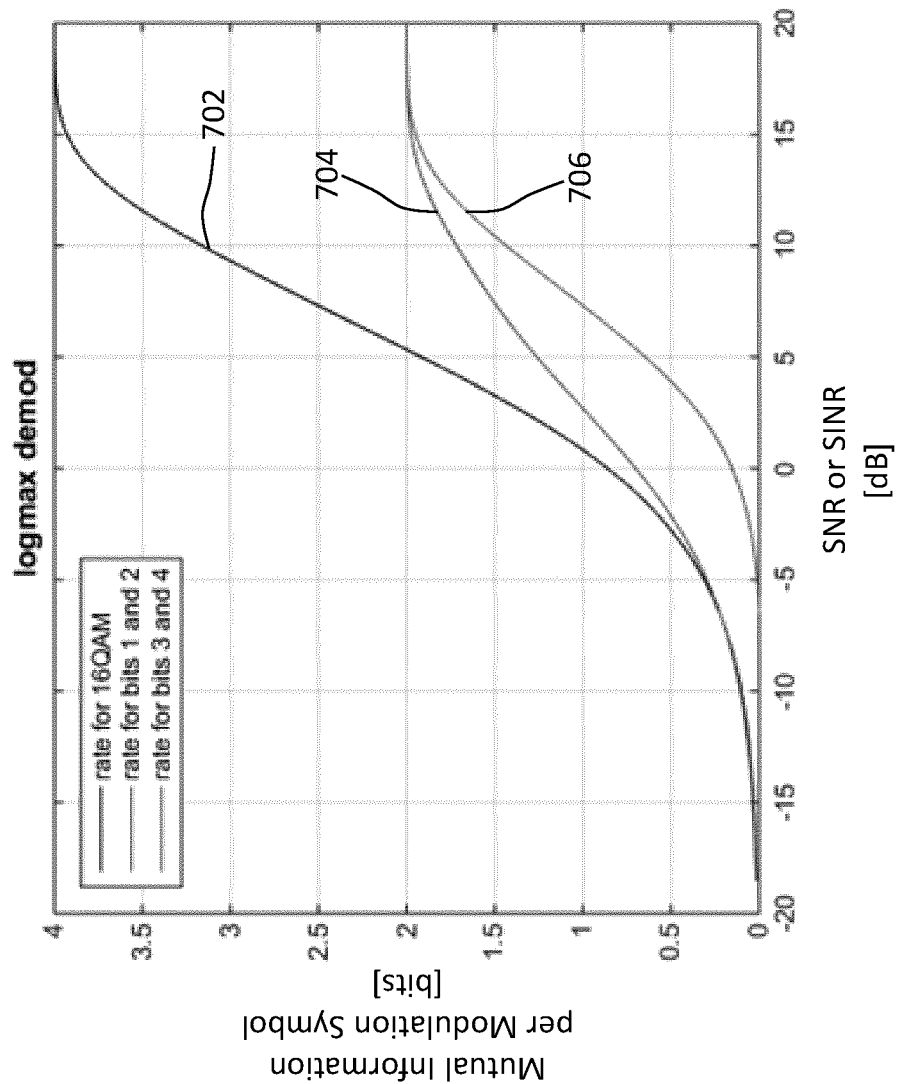
FIG. 7 shows a diagram schematically illustrating exemplary robustnesses or portions of mutual information of first and second layers of a multi-layer transmission.

In FIG. 7, the information rates 704 and 706 (e.g., the portions of the mutual information per modulation symbol) for the different bits as well as the total information rate 702 (e.g., the mutual information per modulation symbol) are schematically illustrated in a diagram 700 in FIG. 7. The information rates are shown on the vertical axis as a function of the SNR or SINR on the horizontal axis. More specifically, the information rates 704 and 706 correspond to the groups of bits (1, 2) and (3, 4), respectively.

In order to extract the information in the receiver 200, the receiver 200 must process the received signal properly. In the example illustrated in FIG. 7, the information is obtained using a decoder that maximizes the logarithm, which is also referred to as log-max approach. For example, the decoder maximizes the logarithm of the likelihood ratio, which is also referred to as maximum likelihood decoding.

FIG. 7 illustrates how the information rates 704 and 706 for the different bits vary with the SNR or the SINR (in units of decibel, dB) of the received signal. The information rate 704 applies for the bits 1 and 2 as a first bit group representing the first data transmitted on the first layer. The information rate 706 applies for the bits 3 and 4 as a second bit group representing the second data transmitted on the second layer.

In a conventional codeword, the different bits will be mapped on modulation symbols and thus typically ¼ of the codeword bits will be mapped as bit 1, bit 2, bit 3, and bit 4, respectively. Assuming the decoding and deinterleaving works as intended, the performance of the error correcting code will effectively be determined by the total information that can be extracted from the bits in the codeword, i.e., the fact that different bits are of different importance (i.e., have different robustness or represent different portions of the mutual information) is of no concern.

The technique can exploit that different bits in a received modulation symbol carry different (and, optionally, SNR-varying) amounts of information (e.g., portions of the mutual information). To provide a motivation for this, again consider FIG. 7 and suppose that a code of rate ¾ is used. In case the coded bits are mapped to bits 1 to 4, as described above, it can be seen that a SNR of at least 9 dB is required to obtain sufficient information (e.g., 3 bits out of 4 corresponds to the ¾ code rate). However, if instead the bits in the codeword would only be mapped on bit 1 and bit 2, which carries relatively more information than bit 3 and bit 4, it can be seen that a SNR of around 7 dB would suffice (e.g., 1.5 bits out of 2 corresponds to the ¾ code rate). Alternatively, if the codeword bits would be transmitted as bit 3 and bit 4 a SNR of 11 dB would be required.

Consider by way of example a situation in which the SNR is changing (e.g., sometimes) from one packet to the next so that it sometimes is 7 dB and sometimes is 11 dB, i.e., with the average being 9 dB, and also suppose that a code with a code rate of ¾ is used. Just considering the amount of information available at the receiver 200, it can be concluded that when the SNR is 7 dB, the decoding will fail, whereas when the SNR is 11 dB, there is a high probability that the decoding will be successful. For the moment one may ignore what error correcting code is actually being used to achieve this, but merely observe what is possible.

In case of a conventional ARQ scheme, a packet that is received at 7 dB SNR will simply have to be retransmitted, and then it is retransmitted until it eventually is transmitted when the channel (i.e., the channel defined by the radio frequency between the transmitter 100 and the receiver 200) happens to be in the state in which the SNR is 11 dB.

If HARQ is used instead, the decoder at the receiver 200 extracts some information also when the decoding fails. Referring to FIG. 7, the receiver can ideally extract about 2.5 bits of information per modulation symbol. Thus, since the packet was transmitted in the step 302 with a rate ¾ and 16-QAM, which implies 3 bits of information per modulation symbol, the decoder at the receiver 200 is effectively lacking 0.5 bits per modulation symbol. The packet is retransmitted according to the step 306. For example, chase combining is used so that the very same packet is transmitted again. For the retransmitted packet, the SNR may now be either 7 dB or 11 dB.

If a packet is received in the step 402 when the SNR of the channel is 7 dB, upon reception 406 of the retransmitted packet, the receiver 200 combines the information from the retransmitted packet with the information extracted from the first packet in the step 402, and effectively have information corresponding to what can be obtained from a packet received at 10 dB, since combining two packet at the same SNR will be the same as receiving one packet at twice the SNR assuming the noise to be uncorrelated. Again, referring to FIG. 7, we see that the information per symbol use at 10 dB exceeds 3, and thus the decoding can be expected to be successful. Although this is the desired outcome, it can be noted that the channel during the retransmission 306 of the packet in fact allowed for 2.5 bits of information per channel use to be extracted, so, since only 0.5 bits per channel use was lacking we have in a sense wasted 2 bits of information in this exemplary embodiment.

If instead a packet is received in the step 402 or 406 when the SNR of the channel is 11 dB, about 3.5 bits of information per channel use (i.e., per modulation symbol) can be extracted at the receiver 200. By the same reasoning, since we know that only 3 bits of information per channel use are needed, transmitting only 3 bits of information is somewhat wasteful. For example, when it is a retransmission 306 of a packet (e.g., the second data) and only 0.5 bits of information per channel use is needed, retransmitting exclusively the packet (i.e., the second data) would effectively waste 3 bits per channel use. The technique may be implemented to transmit another codeword (e.g., the third data) superimposed, since 3 bits per channel use is exactly what is needed for potentially being able to decode the other codeword correctly.

As a simple numerical comparative example useful for illustrating an exemplary advantage achievable by implementing the technique, suppose the channel (i.e., the SNR of the channel) is toggling between 7 dB and 11 dB so that conventionally (i.e., without a multi-layer transmission) two consecutive transmissions are received at a SNR of 7 dB followed by one transmission at a SNR of 11 dB. Thus, 3 transmissions are conventionally needed for 2 packets. The first two transmissions comprise only the first packet and are combined so that the first packet is correctly received. The third transmission will directly result in a correctly received second packet. Stated in another way, the average transmission rate is 2 bits per modulation symbol.

FIG. 8 schematically illustrates the comparative example of mapping 800 two bit strings 802 and 804 (e.g., codewords 1 and 2) to two modulation symbols 902 and 904, respectively.

In contrast, FIG. 9 schematically illustrates an exemplary embodiment that maps 900 the bit strings 802 and 804 representing the first and second data to the first and second layers 902 and 904, respectively. In the embodiment illustrated in FIG. 9, the transmission 302 of each of the bit strings 802 and 804 may extend in time over the two modulation symbols 806 and 808.

The different groups of bits, e.g., the first bit group ($b_1$, $b_2$) and the second bit group ($b_3$, $b_4$), carry different amounts of information (e.g., different portions of the mutual information). Specifically, data may be encoded using a code rate of ½. The resulting codewords are not mapped one-to-one to a modulation symbol, e.g., a 16-QAM symbol. Rather, for each of the multiple layers 902 and 904, a codeword is generated (e.g., per modulation symbol). For example, two codewords are generated for the first layer 902 and the second layer 904, respectively. The first codeword 802 is mapped on bits $b_1$ and $b_2$ and the second codeword 804 is mapped on bits $b_3$ and $b_4$. Consequently, two codewords are transmitted in parallel in the step 302 and/or 306. The duration of a codeword will be twice as long compared to the comparative example, so that the data rate for the initial transmission 302 is identical in both exemplary cases illustrated in FIGS. 8 and 9, respectively.

An implementation of the technique may use that different layers 902 and 904 of the multi-layer transmission have different robustnesses, e.g., that different bits in a modulation symbol carry different amounts of information (e.g., different portions of the mutual information). In other words, the different bits within a modulation symbol (i.e., the different bits in a bit string represented by the modulation symbol) are not equally reliable or robust, so that bits 1 and 2 associated with the first layer are more reliable or robust than bits 3 and 4 in the examples of FIGS. 6 to 9.

The following embodiment uses the same assumptions as before, i.e., the SNR is either 7 dB or 11 dB. Referring to FIG. 7, in case of a SNR of 11 dB, the second data 802 (i.e., the Codeword 2) is also successfully decoded at the receiver 200. According to FIG. 7, this is in practice possible with a very small margin. In case the SNR is 7 dB, only the first data (i.e., the Codeword 1) is successfully decoded at the receiver 200. However, the receiver 200 is still able to extract about 1 bit of information per channel use (i.e., per modulation symbol) for the second data 804 (i.e., the Codeword 2).

In the next transmission 306, one new codeword is generated representing the third data, since the Codeword 1 for the first data was correctly received according to the feedback message in the second variant. The second data (e.g., the Codeword 2 in the case of chase combining) is retransmitted according to the second variant of the steps 306 and 406. The retransmitted second data (e.g., the Codeword 2 in the case of chase combining) may be mapped on the first layer 902 (i.e., on the bit 1 and bit 2 in the exemplary embodiment using 16-QAM).

Alternatively, the second data 804 may be mapped again on the second layer 904 (e.g., on bit 3 and bit 4 in the exemplary embodiment using 16-QAM).

While a multi-layer transmission without HARQ may map a retransmitted packet to the more robust or the most robust layer (e.g., the more or most reliable bits) to ensure that a delay caused by the retransmission is minimized, the technique may be implemented using HARQ to improve spectrum efficiency, e.g., by selecting the layer (e.g., the corresponding bit group) for the retransmission in the step 306, which gives enough additional information to correctly decode the respective data at the receiver 200, but not more additional information than is needed for the correctly decoding or not additional information in an excessive way.

In the example of the SNR being 7 dB, the receiver 200 is able to extract 1 bit of information per channel use (e.g., per modulation symbol) on the second layer 904 (i.e., for Codeword 2 in the step 402). Consequently, when retransmitting the second data (e.g., the Codeword 2 in the case of chase combining), only another 0.5 bits per channel use are needed for correct decoding of the second data 804. Since this is achievable also if the second data 804 (e.g., the Codeword 2) is retransmitted on the second layer 904 (e.g., the bits 3 and 4 of the second bit group), the second data 804 is retransmitted in the step 306 using again the second layer 904.

Hence, for the same numerical conditions of the channel toggling between 7 dB and 11 dB so that two consecutive transmission are received at 7 dB followed by one transmission at 11 dB SNR, the exemplary embodiment achieves the following performance. In a first transmission according to the step 302 at SNR=7 dB, the first data 802 (e.g., the Codeword 1) on the first layer 902 is successfully received and decoding of the second data 804 (e.g., the Codeword 2) received on the second layer 904 fails. In a second transmission according to the step 306 at SNR=7 dB, third data (i.e., new data, e.g., a new Codeword 1) is successfully transmitted on the first layer 902, and the second data 804 (e.g., the Codeword 2 in the case of chase combining) is successful transmitted (i.e., retransmitted) on the second layer 904. In an optional third transmission, which may be a further instance of the step 302 or 306, at SNR=11 dB, fourth data (e.g., a new Codeword 1) and fifth data (e.g., a new Codeword 2) are successful transmitted on the first layer 902 and the second layer 904, respectively.

In total 5 pieces of data (e.g., 5 codewords) are successfully received during these 3 transmissions, compared to 4 codewords according to prior art (e.g., according to the comparative example). This corresponds to a gain of 25%. It is noted that if the retransmission of the Codeword 2 in the step 306 instead would have used the first layer 902 (e.g., the bits 1 and 2), the new codeword (on the second layer 904) would have failed, since it would have been transmitted using bits 3 and 4, and there would be no gain compared to the prior art. Although a very simple example, the exemplary embodiment illustrates the advantage of using the channel capacity more efficiently, i.e., the effect of a gain in spectral efficiency by not wasting more bits than necessary for the retransmission of data.

Having outlined a basic concept or origin for achieving the potential gain as well as the features to obtain the gain, further embodiments of the technique are described below in some more detail. Each of these embodiments may be compatible with or comprise any one of the features described above, particularly with reference to any one of the FIGS. 1 to 9.

In any embodiment, the multiple layers may be implemented by codewords transmitted in parallel (e.g., simultaneously or in the same modulation symbol). Analogously, the number of codewords transmitted in parallel may be referred to as the number of the multiple layers in the multi-layer transmission. The transmission of the multiple layers in parallel may be distinct from a transmission of several streams, e.g., as done for a multiple-input multiple-output (MIMO) channel between transmitter and receiver. For example, the concept of multiple layers (i.e., the multi-layer transmission) is applicable also when a single antenna is used at the transmitter 100 and/or the receiver 200. Furthermore, in case of a MIMO channel between the transmitter 100 and the receiver 200, the concept of multiple layers is applicable per MIMO stream (i.e., spatial stream) of the MIMO channel.

A first embodiment using a multi-layer HARQ transmission is described. According to the first embodiment, information is encoded and transmitted from one transmitter 100 to one receiver 200. The FEC encoding may be based on a convolutional code, an algebraic block code, a low density parity check (LDPC) code, or some other error correcting code. The encoded bits are formed into codewords, and the bits in the different codewords are mapped to non-binary modulation symbols in a way that different bits represented by these non-binary symbols have different robustness (e.g., reliability or portions of the mutual information) and, thus, when received by the receiver 200 typically carry a varying amount of information.

Furthermore, each non-binary symbol carries information from at least two different codewords, i.e., at least the first data on the first layer and the second data on the second layer.

An example modulation may have a size $M=2^m$, wherein m is an integer greater than 1, e.g., in the range $2 \leq m \leq 10$. The number of multiple layers is equal to or less than m, e.g., 2 or 3.

The encoders used for the different layers may or may not be identical. In one implementation, different codes may be used such that, e.g., layer 1 is using a convolutional code, while layers 2 and 3 are using LDPC codes. In another implementation, the multiple layers may use the same type of code, e.g. LDPC. Furthermore, in any of the implementations, the code rates used for the different layers may be different.

The technique may be implemented as method of assigning or selecting an MCS (which is also referred to as a rate assignment), e.g., depending on a target value for a bit error ratio and/or a codeword error ratio. Given an average expected SNR and the associated uncertainty range, the transmitter 100 determines a multitude of SNR targets for each of the multiple layers (e.g., for each of the first and second layers). The uncertainty range may be defined by the standard deviation of SNR, e.g., relative to the expected average SNR. The uncertainty range may be an accuracy requirement or an agreement specified or agreed between the transmitter 100 and the receiver 200 (e.g., a SNR feedback agent at the receiver 200). The uncertainty range may be further determined from previous feedback messages (e.g., expressly or implicitly) indicative the SNR. The previous SNRs may be stored in logs, records or histograms.

Further advantages and implementations of encoding multiple codewords for the multiple layers, respectively, are described. Each codeword for the individual layer may further incorporate a cyclic redundancy check (CRC) to verify at the receiver 200 whether the respective codeword is decoded successfully. When at least one of the codewords is decoded successfully, the soft values for the one or more other codewords may be computed using this additional information such that an enhanced reliability is achieved.

Figure 10:
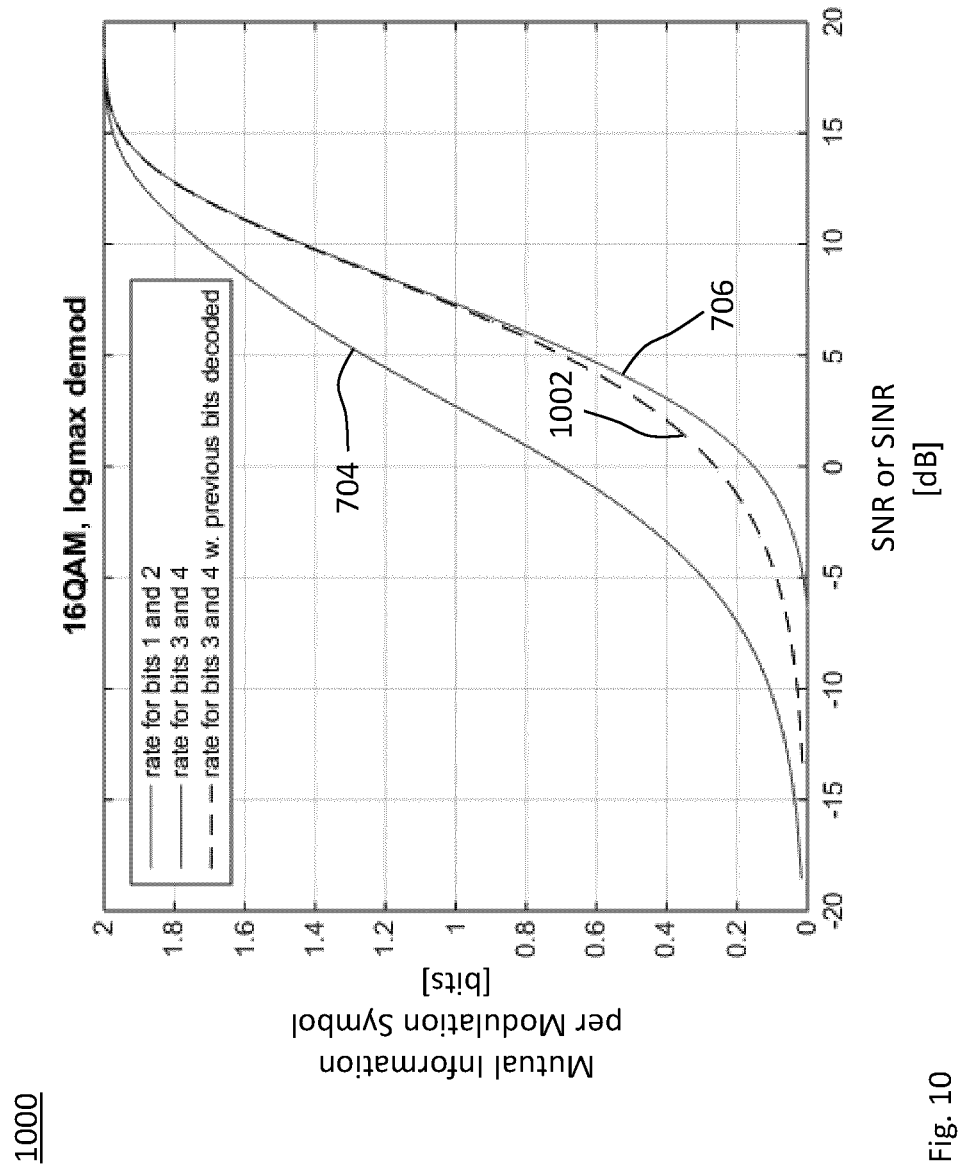
FIG. 10 shows a diagram schematically illustrating exemplary robustnesses or portions of mutual information of a multi-layer transmission after successfully decoding at least one of the multiple layers.

FIG. 10 shows a diagram 1000 schematically illustrating exemplary robustnesses or portions of mutual information of the multi-layer transmission 302 or 306 after successfully decoding at least one of the multiple layers, e.g., the first data 802 received on the first layer 902. For conciseness and without limitation, the example in FIG. 10 is based on a 16-QAM modulation, e.g., in the context of the exemplary embodiment described above.

After the first data (e.g., Codeword 1) received on the first layer 902 (e.g., based on bits 1 and 2) is successfully decoded in the step 402, the soft values computed (or recomputed) for bits 3 and 4 achieve an information rate 1002 that is greater than the information rate 706 when such additional information based on the first layer (e.g., based on the bits 1 and 2) is not available. With this approach, the multi-layer HARQ receptions 402 and/or 406 can achieve an overall greater data rate or higher robustness (i.e., reliability) than a conventional approach of jointly encoding and decoding across all 4 bits of the 16-QAM.

More specifically, FIG. 10 schematically illustrates how the information rate for the different layers (e.g., the different bits) varies as a function of the SNR or SINR (in units of dB) of the received signal in case of 16-QAM when codeword 1 is successfully decoded.

As second embodiment uses non-uniform constellations for the multi-layer HARQ transmission and reception. The second embodiment may comprise any one of the features described above, particularly any one of the features of the exemplary embodiment and/or the first embodiment. For example, the second embodiment may be implemented by replacing the 16-QAM by, or combining the 16-QAM with, a modulation using a non-uniform constellation.

As illustrated in some detail in the above embodiments, the different bits mapped to a modulation symbol typically carry different amounts of information (e.g. different portions 704 and 706 of the mutual information 702). In the above embodiments, the difference was in the range of 3 to 6 bits (e.g., using 16-QAM in combination with a code rate of %). In case of greater modulation alphabets, the difference between the bits carrying the most information and the ones carrying the least information can be significantly larger.

Figure 11:
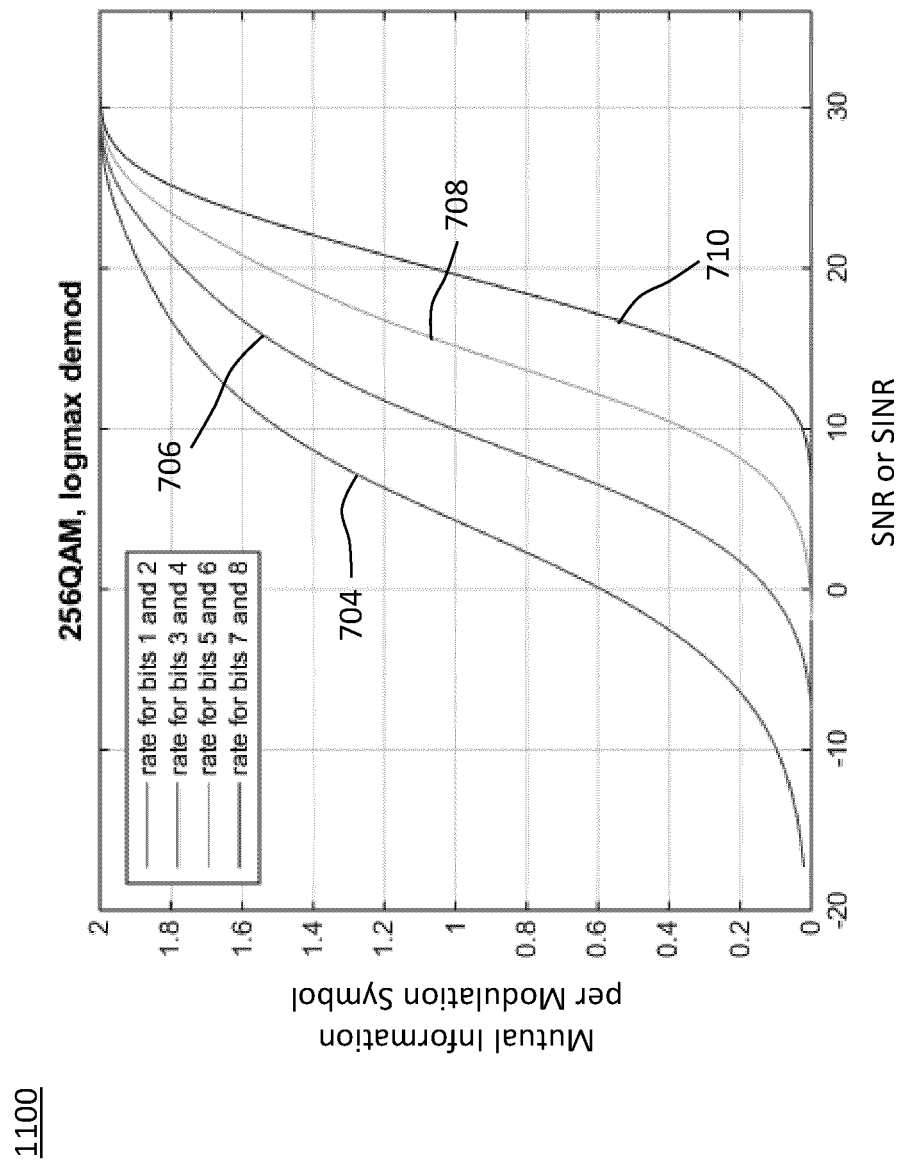
FIG. 11 shows a diagram schematically illustrating exemplary robustnesses or portions of mutual information of four layers of a multi-layer transmission.

FIG. 11 schematically illustrates how the information rate for the different layers (e.g., the corresponding bits) varies with the SNR or the SINR (in units of dB) of the received signal in case of 256-QAM. Information rates 704 to 710 (e.g., portions of the mutual information) for four layers, respectively, are schematically illustrated as functions of the SNR or the SINR for the multi-layer transmission using a 256-QAM. As can be seen in FIG. 11, each of the 8 bits per modulation symbol falls in one of four categories with around 5 dB difference between two adjacent categories, implying that the difference between the bits carrying the most information and the bits carrying the least amount of information is about 15 dB. More specifically, the information rates 704, 706, 708 and 710 correspond to the groups of bits (1, 2), (3, 4), (5, 6), and (7, 8), respectively.

Figure 12:
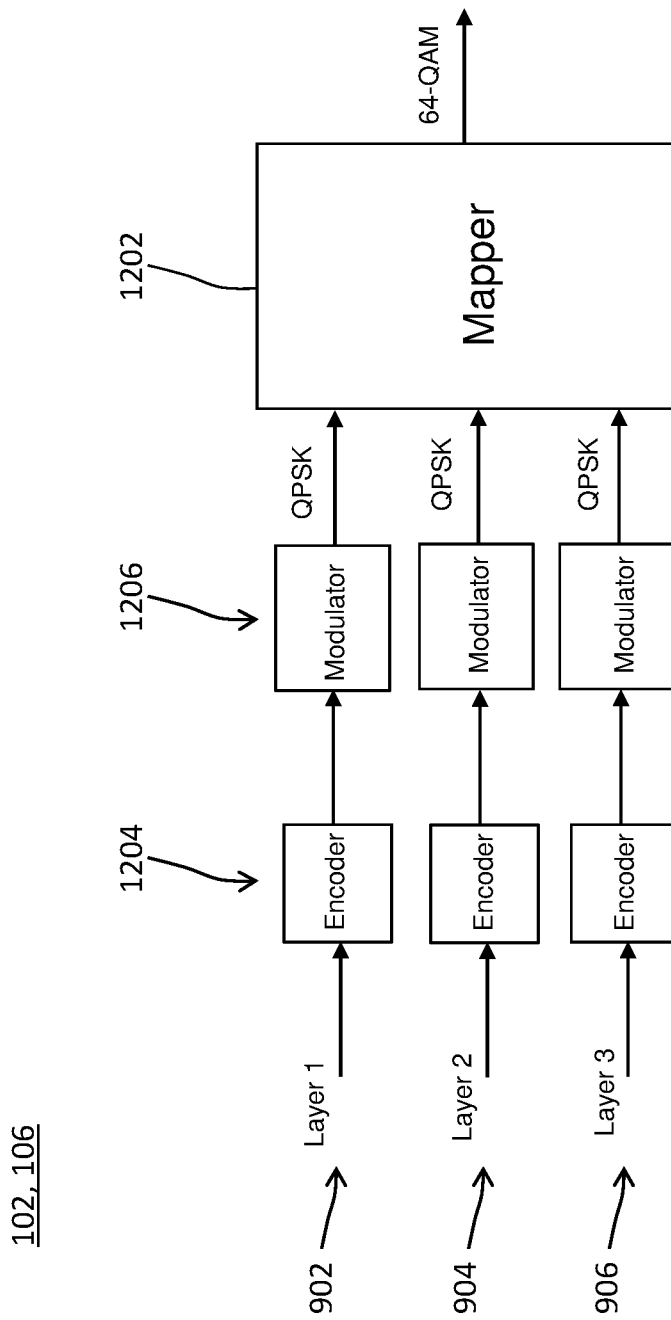
FIG. 12 schematically illustrates an exemplary embodiment, in which data of different HARQ processes is hierarchically mapped to the layers of the multi-layer transmission.

FIG. 12 schematically illustrates a block diagram for implementing at least one of the multi-layer transmission module 102 and/or the multi-layer retransmission module 106 at the transmitter 100. For example, the same unit may be configured to perform both the step 302 and the step 306. Features corresponding to those disclosed in the context of FIG. 12 may be implemented at the receiver 200.

The multi-layer transmission 302 and/or 306 may be implemented using a multiplexer (MUX) and/or a constellation mapper 1202. The MUX may map the data of different HARQ processes to the respective layer, e.g., according to the state of the HARQ processes, the feedback message and/or the amount of missing information for correctly decoding the respective data. The mapper 1202 assigns partial modulation symbols in a hierarchical constellation to groups of bits representing the respective data of the respective layers. For example, some bits in the constellation of a Gray-mapped QAM are more robust than others. Thus, bits corresponding to the first data (e.g. a first message) may be mapped to one or more first partial modulation symbols defining the first layer (e.g., a first bit group in the Gray-mapped QAM symbols), while bits corresponding to the second data (e.g. a second message) may be mapped to one or more second partial modulation symbols (e.g., a second bit group in the Gray-mapped QAM symbols) that are less robust than the first partial modulation symbols.

The multi-layer transmission 302 and/or 306 may be further implemented using, for each of the multiple layers 902 to 906, an encoder 1204 and/or a modulator 1206. Each encoder 1204 is configured to encode the respective data of the respective layer, e.g., resulting in a corresponding codeword. Each modulator 1206 is configured to generate the respective partial modulation symbol for the respective one of the multiple layers 902 to 906.

In FIG. 12, the encoders 1204 may or may not be identical. In principle, completely different codes may be used for the different layers 902 to 906 such that, e.g. the first layer 902 is using a convolutional code, whereas the second layer 904 and the third layer 906 are using LDPC codes. It may also be so that the layers are using the same type of code, e.g. LDPC, but the code rates used for the different layers may be different.

Typically, the larger the modulation alphabet, the larger the difference between the information rates (e.g., the portions of the mutual information) carried by different bits. In case it is desirable to have a large difference between the information rates carried by the different bits without using a very large modulation alphabet this can be achieved by using non-uniform signal constellations.

Figure 13:
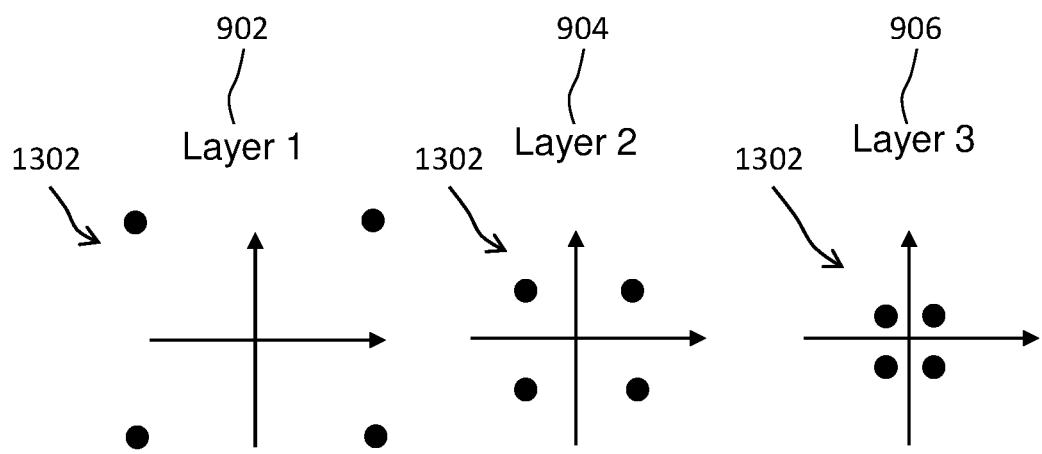
FIG. 13 schematically illustrates exemplary constellation diagrams for partial modulation symbols corresponding to different layers, respectively.
Figure 14:
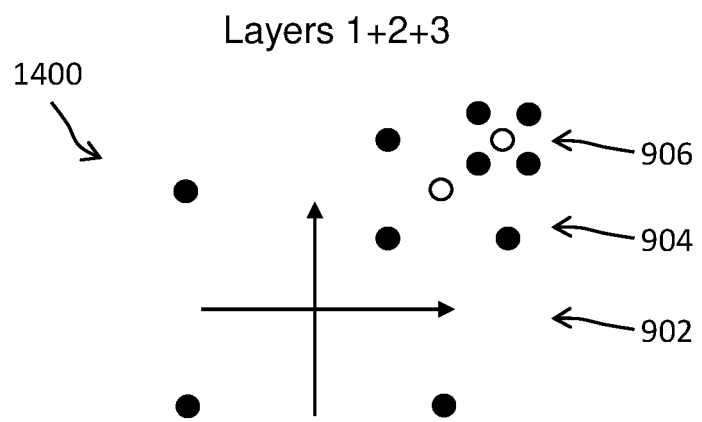
FIG. 14 schematically illustrates an exemplary constellation diagram for one modulation symbol resulting from combining partial modulation symbols corresponding to different layers, respectively.

FIGS. 13 and 14 schematically illustrate a first example for generating a non-uniform constellation. In the first example, by way of illustration and without limitation, the data is encoded, modulated and/or transmitted in three layers 902, 904 and 906. Each of the multiple layers is encoded and/or modulated by the respective encoder 1204 and modulator 1206, e.g., using quadrature phase-shift keying (QPSK) in each of the multiple layers, resulting in a partial modulation symbol 1302 for the respective layer.

The final signal constellation point is obtained by superposition (e.g., addition in the complex plane) of the multiple partial modulation symbols 1302 (e.g., the three QPSK signals), resulting in the modulation symbol 1400 schematically illustrated in FIG. 14.

The difference in the robustness (e.g., the portion of the mutual information and/or the reliability) between the different layers may be controlled by transmitting and/or combining the multiple layers with different powers (e.g., by combining the partial modulation symbols with different amplitudes), e.g., as schematically illustrated in FIGS. 13 and 14.

More specifically, FIG. 13 illustrates the modulation used for each of the multiple layers, e.g., each comprising 2 bits for a partial modulation alphabet of size 4. FIG. 14 illustrates how the multiple layers 902 to 906 are combined to generate one of modulation symbol 1400 of the modulation alphabet, e.g., one of 64 possible modulation symbols. The multi-layer transmission is implemented as a hierarchical modulation, since the multiple layers are combined and transmitted with different powers.

The following implementations of the feedback message transmitted in the step 304 and received in the step 404 may be applied to any embodiment described herein. Particularly, the feedback message may be indicative of additional information (e.g., the amount of additional information) that is required for correctly decoding the respective data of any one of the HARQ processes.

The basic idea with multi-level HARQ is to have a coding scheme that is better matched to the actual channel conditions. By using two or more layers of the multi-layer transmission, more freedom is obtained, which can be exploited when the channel conditions are changing and therefore may be largely unknown for the receiver at the time for the transmission.

In one embodiment, the HARQ processes are mapped to the respective layers and/or the robustnesses of the respective layers are controlled so that the multi-layer transmission of each layer is decodable (e.g., based on SNR or SINR reported in the feedback message), but not with a large margin since such a large margin essentially implies that the channel has not been effectively used.

The feedback message may be a means to not have a too large margin (e.g., in terms of additional information) when transmitting the respective data on the respective layer at the transmitter and when decoding the respective data received on the respective layer at the receiver 200.

For example, the HARQ processes (e.g., the corresponding data) are mapped to the respective layers and/or the robustnesses of the respective layers are controlled or changed based on the feedback message. The feedback message enables the transmitter 100 to control or change at least one of the robustnesses of the multiple layers and the mapping of the HARQ processes to the multiple layers.

By means of the feedback message, the receiver 200 feeds back information to the transmitter 100 regarding how far from successful decoding a layer (or the corresponding HARQ process) is. In other words, the receiver 200 determines the amount of additional information required for correctly decoding the respective data. In case the receiver 200 determines that a certain amount of additional information is required, the feedback message is indicative of the amount of additional information (e.g., which implies no positive acknowledgment for the respective data).

The feedback message may enable the transmitter 100 to retransmit the particular data (e.g., either on the same layer or another layer that is more appropriate in terms of the required additional information) in a way that only or essentially the additional information is provided to the receiver 200. For example, the retransmission in the step 306 may provide at most 110%, 150% or 200% (i.e., twice) the amount of the required additional information. More specifically, the provided amount of additional information may be (1+x) the amount of the required additional information (e.g., based on the feedback message), wherein 0<x<1 depends on the variance (e.g., the standard deviation) of the SNR or the SINR (e.g. based on the feedback message).

For example, if the feedback message indicates that only a fraction of the initial information of the respective data (e.g., only a little amount of additional information) is required as additional information for correctly decoding, the transmitter 100 may select for the retransmission in the step 306 the same layer previously used for the (e.g., initial) transmission 302 or a layer having less robustness than the layer used for the initial transmission 302. On the contrary, if the feedback message indicates that substantially the initial information of the respective data (e.g., more than 50% or 90% of the initial information, or a lot of additional information) is required for successfully decoding of the respective data, this information is transmitted back to the transmitter 100 in the feedback message. Responsive to the feedback message, the transmitter 100 may allocate a layer (i.e., map a layer to the respective HARQ process) that is more reliable than the layer used in transmission 302 for the retransmission of the respective data.

One or more parameters for the multi-layer HARQ transmission 302 and/or 306 may be fed back or reported to the transmitter 100 in the feedback message. The one or more parameters may comprise at least one of a SNR at the receiver 200; a SINR at the receiver 200; at least one control parameter for controlling the (e.g., relative or absolute) robustnesses of the multiple layers; and an indicator indicative of the amount of the additional information required for correctly decoding the respective data of the respective HARQ process. The feedback message may be implemented as a (e.g., backward compatible) extension of the ACK or NACK feedback. The one or more parameters may be included or appended to the ACK or NACK feedback as additional information. For example, instead of using one bit for a conventional ACK or NACK feedback, one byte may be used. The additional information may be indicative of how close any one or each of the HARQ processes (i.e., the respective data, e.g. a data packet) was to be correctly decoded.

Any of the one or more parameters and/or the amount of addition information required for correctly decoding may be computed on the PHY layer, e.g., in functional relation to the decoding of the respective data (e.g., the receptive codeword). For example, the decoding and the computing of the one or more parameters for the feedback message may take place on the same layer. The feedback message may also be referred to as multi-layer HARQ feedback.

Figure 15:
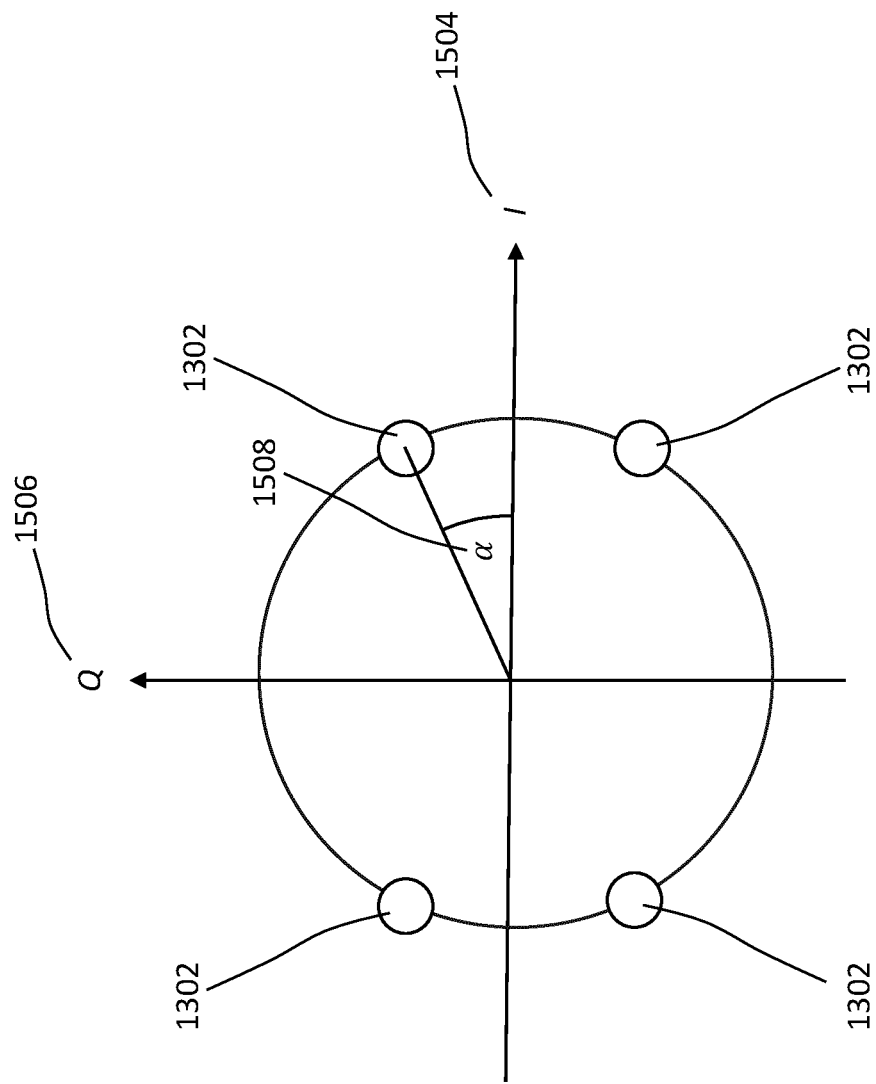
FIG. 15 schematically illustrates an exemplary constellation diagram for one modulation symbol carrying two layers with changeable robustnesses.

FIG. 15 schematically illustrates a second example for generating a non-uniform constellation 1500. Furthermore, the non-uniform constellation is an example for a controllable modulation (or controllable MCS), which can be controlled by at least one control parameter. The merit of the feedback message and/or controlling the robustnesses is outlined using the specific example of FIG. 15 for clarity and concreteness. While the example of FIG. 15 comprises one control parameter, a controllable modulation or controllable MCS using more than one control parameter can be readily implemented. For example, the non-uniform modulation according to the second example (e.g., as described with reference to FIG. 15) may be combined according to the first example (e.g., as described with reference to FIGS. 13 and 14).

The second example of a modulation using a non-uniform constellation 1500 illustrated in FIG. 15 is an adaptive (i.e., controllable) version of QPSK. One of the multiple layers (e.g., the first layer 902) is transmitted in the in-phase (I-phase) component 1504. Another one of the multiple layers (e.g., the second layer 904) is transmitted in the quadrature-phase (Q-phase) component 1506.

Referring to FIG. 15, the robustnesses (e.g., the portion of the mutual information or the reliability) for the two layers are (e.g., relatively) adjusted (i.e., changed or controlled) by an angle $\alpha$, which is an example for the control parameter. If it is desirable to transmit the I-phase layer (e.g., the first layer) more robustly than the Q-layer (e.g., the second layer), the angle $\alpha$ is selected to be relatively small (i.e., less than 45°), e.g., 10° to 30° (i.e. 10 to 30 degrees). If, on the other hand it is desirable that the Q-phase layer (e.g., the second layer) is more reliable than the I-phase layer (e.g., the first layer), the angle $\alpha$ may instead be selected to be greater than 45°, e.g., in the range of 60° to 80° (i.e., 60 to 80 degrees).

By way of example, the same code (e.g., LDPC) is used (i.e., to encode at the transmitter 100 and to decode at the receiver 200) the information (i.e., the first and second data) for both the first and second layers. The code rate may be fixed to ½. The code used may be the smallest LDPC used in the standard family IEEE 802.11, i.e., the parity check matrix H may be of dimension 324×648. The bit error ratio 1602 (BER, or the bit error ratio) and the codeword error ratio 1604 (CWER, or the codeword error ratio) for this code when used over an additive white Gaussian noise (AWGN) channel between the transmitter 100 and the receiver 200 is depicted in the diagram 1600 of FIG. 16.

The SNR shall be defined as the signal-to-noise ratio (i.e., a ratio of signal power to noise power) with the signal power being the (e.g., combined) signal power for both layers.

Hence, the effective SNR for the layer (e.g., the first layer or for the corresponding first codeword) transmitted in the I-phase is $$SNR_I = SNR \cdot \cos^2 \alpha.$$

By similar reasoning, the effective SNR for the layer (e.g., the second layer or for the corresponding second codeword) transmitted in Q-phase is $$SNR_Q = SNR \cdot \sin^2 \alpha.$$

For simplicity of the explanation and without limitation, controlling the robustnesses of the first and second layers is illustrated under the assumption that the SNR is 0 dB.

Figure 16:
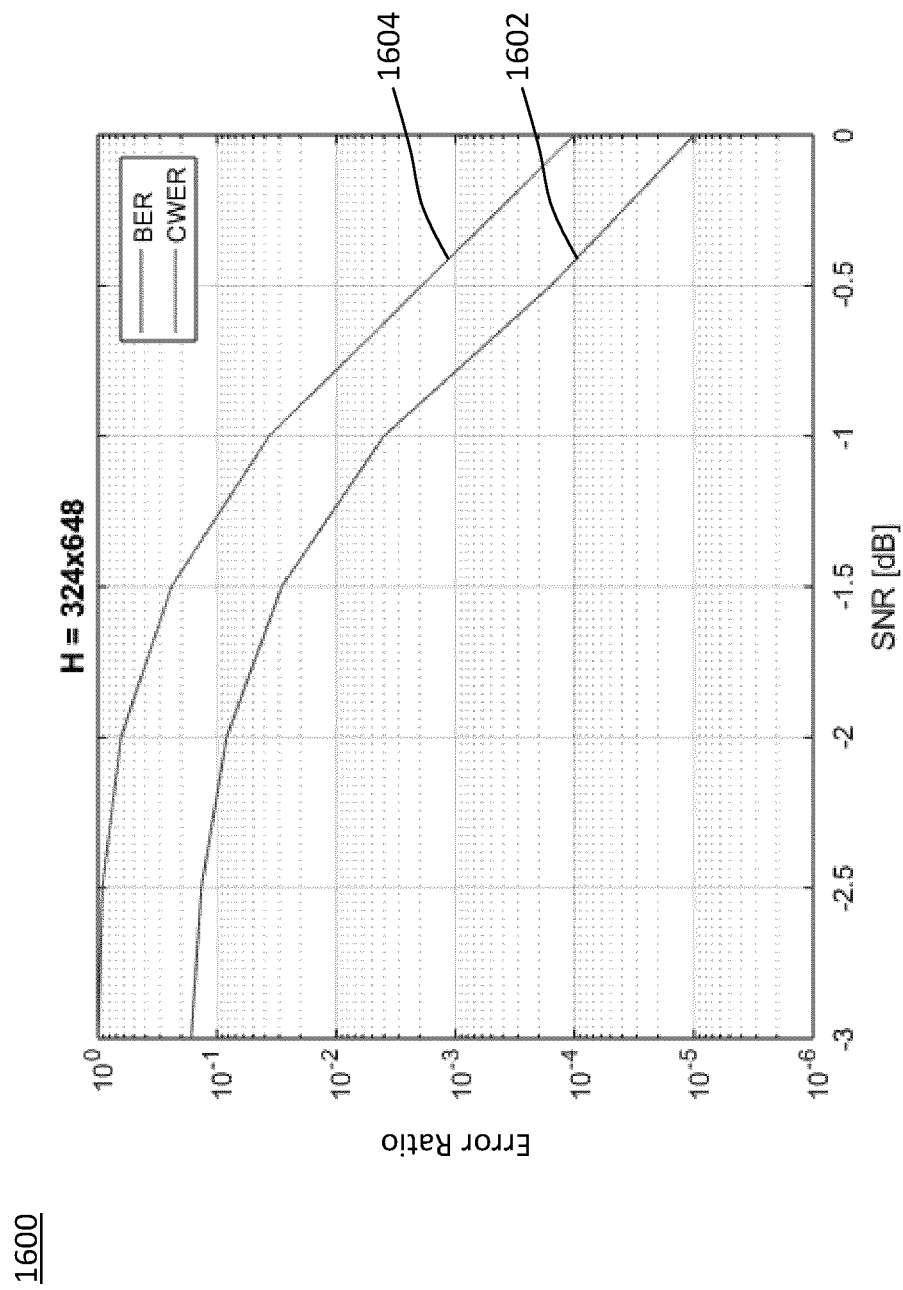
FIG. 16 shows a diagram schematically illustrating examples of a bit error ratio and a codeword error ratio of a multi-layer transmission.

Referring to FIG. 16, if $\alpha=45$ degrees, the SNR for both layers will be −3 dB and, thus, the codewords for both layers will almost certainly be in error. On the other hand, if the angle $\alpha=0$, the SNR in the I-phase will be 0 dB and the first codeword will with very high likelihood be correctly decoded since a CWER is $10^{-4}$ (i.e., ten to the minus 4). The second codeword sent in the Q-phase will of course carry no information in this case since no energy is transmitted in the Q-phase.

A CWER equal to or on the order of 1% is acceptable and/or negotiated between the transmitter 100 and the receiver 200, the angle $\alpha$ may be set to (or starting from $\alpha=0$, increased to) 24 degrees. In general, based on the CWER as a function of the SNR and a given target value for the CWER 1604, the required layer-specific SNR, for the I-phase (which is equal to or on the order of −0.8 dB in the example) may be determined. The above triangular relation allows determining the control parameter $\alpha$ or a minimum, $\alpha_{min}$, for the control parameter a based on the layer-specific $SNR_I$ (which is equal to or on the order of 24 degrees).

In the example of a target value for the CWER being 1%, i.e., the receiver 200 is able to decode the first codeword transmitted in the I-phase (e.g., the first data on the first layer) with 99% probability. At the same time, by virtue of the multi-layer transmission 302 and/or 306, the transmitter 100 is able to transmit some information also for the second codeword in the Q-phase (e.g., the second data on the second layer). In the example, for $\alpha=\alpha_{min}=24$ degrees, the second codeword in the Q-phase (e.g., the second data on the second layer) is transmitted at a layer-specific $SNR_Q$ of −7.7 dB. Naturally, the second codeword transmitted in the Q-phase will not be correctly decoded. However, the decoder at the receiver 200 is still able to extract a bit of information as to the second codeword.

In the next transmission 306, the second codeword previously transmitted in the Q-phase is retransmitted in the I-phase, i.e., on the first layer. That is, the mapping of the second HARQ process (or the corresponding second data) is changed from the second layer to the first layer. Furthermore, a new third codeword (i.e., third data) is transmitted in the Q-phase (i.e., on the second layer). The target value for the CWER may be maintained (e.g., to be equal to 1%) for the second codeword sent in the I-phase (i.e., for the first layer), which corresponds to a layer-specific $SNR_I$ of −0.8 dB. Since the receiver 200 already has some information about the second codeword (corresponding to the second codeword previously received at a SNR of −7.7 dB), it can be determined that it suffice if the retransmitted codeword is received at a SNR of −1.8 dB. Therefore, the angle $\alpha$ can be increased in the next transmission 306 (from $\alpha=\alpha_{min}=24$ degrees) to $\alpha=35$ degrees, allowing even more information to be transmitted in the Q-phase, i.e., on the second layer. With $\alpha=35$ degrees the effective SNR in the Q-phase, i.e., the layer-specific $SNR_Q$, becomes −4.7 dB.

The procedure may be repeated for each data packet to be transmitted from the transmitter 100 to the receiver 200. That is, new data for a new packet is initially transmitted in the Q-phase, i.e., on the second layer, according to the step 302. If this packet is not successfully decoded (e.g., based on the feedback message in the step 304), it is retransmitted in the I-phase, i.e., on the first layer according to the step 306.

By the same token, since the amount of information transmitted in the Q-phase (i.e., the second layer) will increase for each packet with the CWER for the I-phase kept constant, the angle $\alpha$ is eventually increased to a value at which the effective SNR in the Q-phase, i.e., the layer-specific $SNR_Q$ is, e.g., on the order of −1 dB, and then also the codeword in the Q-phase (i.e., the second layer) is correctly decoded.

Figure 17:
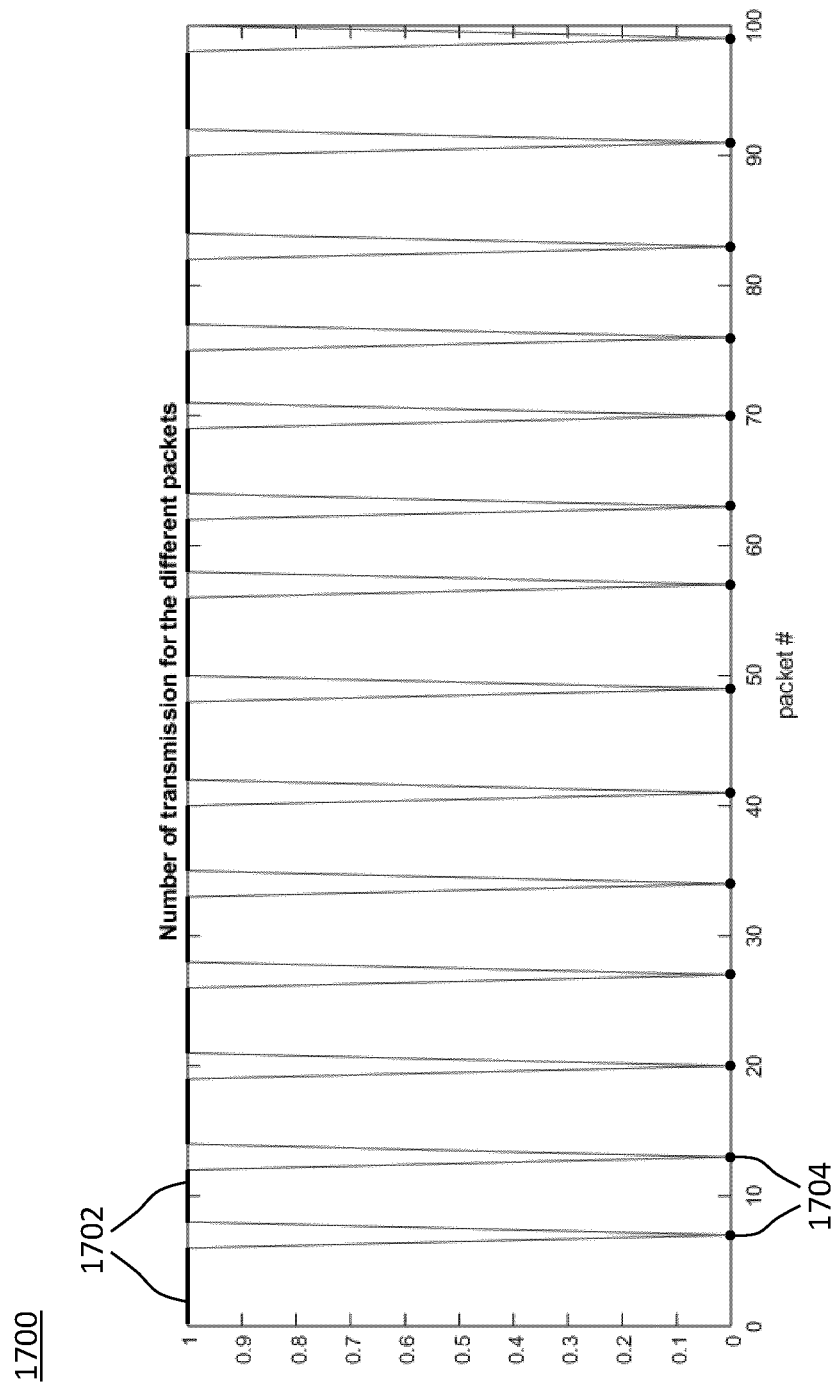
FIG. 17 shows a time sequence of new data packets per multi-layer transmission.

The algorithm described above was implemented and evaluated for transmitting 100 codewords. In FIG. 17, the number of transmissions in the I-phase for each one of the 100 codewords is depicted. More specifically, the horizontal axis of the sequence 1700 is a serial number or consecutive index of the respective packets. The vertical axis indicates the number of transmissions 302 or 306 for the respective packets. The number is 1 at reference signs 1702 when the data transmitted on the first layer (i.e., in the I-phase) is correctly decoded. The number is 0 at reference sign 1704 when also the data transmitted on the second layer (i.e., in the Q-phase) is correctly decoded.

The default or most frequent case is that the codeword transmitted or retransmitted in the I-phase (i.e., on the first layer) is correctly decoded, while the codeword transmitted in the Q-phase (i.e., on the second layer) mostly is received in error. However, because of the adaptive nature of the HARQ, i.e., because of controlling the robustnesses by means of the control parameter, more and more information can be transmitted in the Q-phase (i.e., on the second layer) so that sometimes also a codeword transmitted in the Q-phase will be correctly received in the very first attempt with no need to be retransmitted in the I-phase (i.e., on the first layer). In FIG. 17, this corresponds to the number of transmissions for that particular packet being zero at reference sign 1704. Out of the 100 packets transmitted in the example shown in FIG. 17, 14 packets were in this way transmitted "for free".

Figure 18:
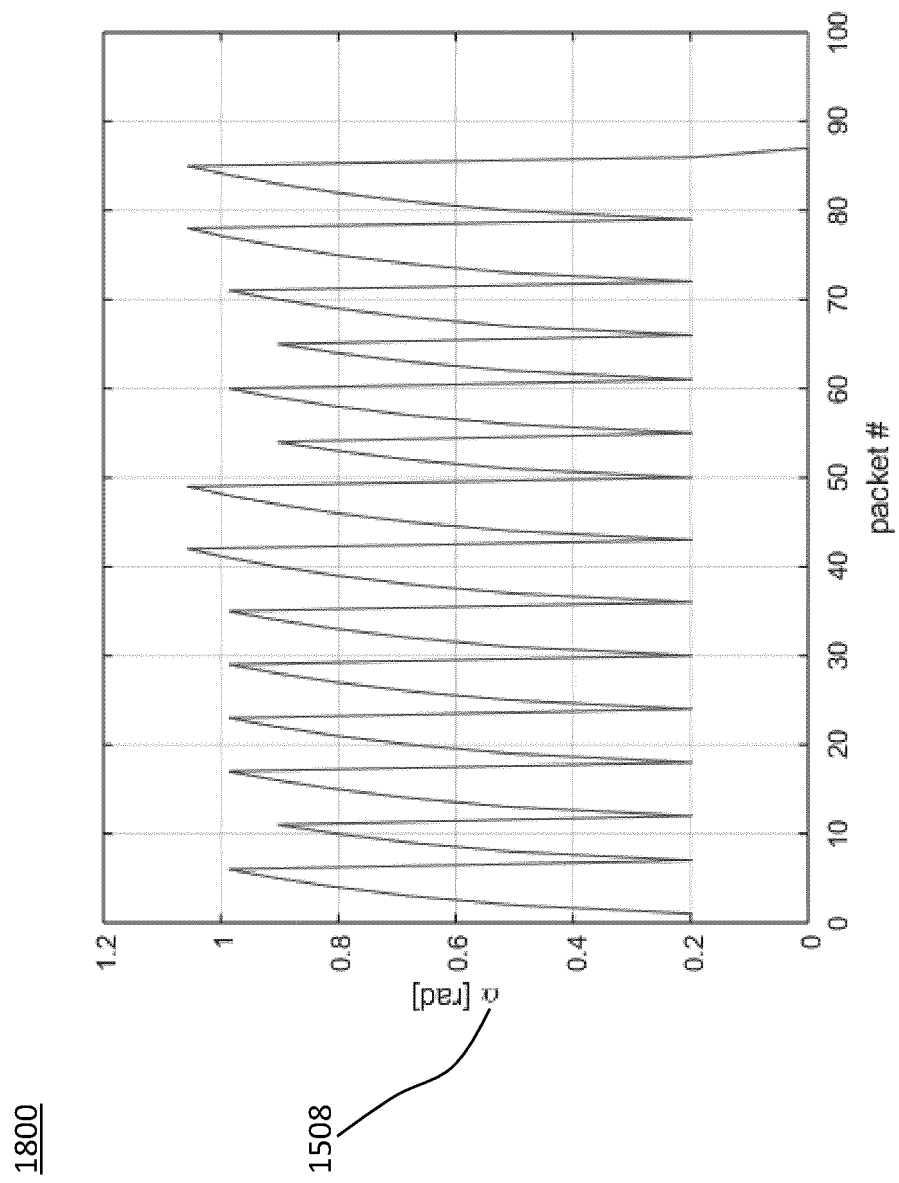
FIG. 18 shows a time sequence of robustness parameter for a multi-layer transmission.

In FIG. 18, the corresponding values for the control parameter 1508, i.e., the angle $\alpha$, are shown as a sequence 1800 over the serial number of the packets (on the horizontal axis). As can be seen, when the angle $\alpha$ is about 1 rad (i.e., 57.3°), the codeword transmitted in the Q-phase (i.e., the second layer) is correctly decoded. Once this occurs, the angle $\alpha$ is reset to an initial value $\alpha_{init}$. The initial value $\alpha_{init}$ may be equal to or on the order of $\alpha_{min}/2$. In the example illustrated in FIGS. 17 and 18, $\alpha_{init}=\text{pi}/16=0.2$ rad=11.5°.

In this example implementation, the receiver 200 feeds back the value of the angle $\alpha$ as a control parameter to be used in the next transmission 306 in the feedback message. A format of this fed back information may be changed in many ways. The specific format may be of little importance. For example, the receiver 200 may request a certain amount of additional information in the feedback message, which the receiver 200 estimates to be missing or needed for decoding correctly after the next reception 406. Alternatively or in addition, based on the feedback message, the transmitter 100 may select or determine which of the multiple layers is used for the retransmitted codeword and/or the transmitter 100 may change one or more control parameters (e.g., for the non-uniform constellation and/or any controllable MCS). Furthermore, based on the feedback message, the transmitter 100 may increase or decrease the number of the multiple layers used in the transmission 306 and/or to change the code rate.

Figure 19:
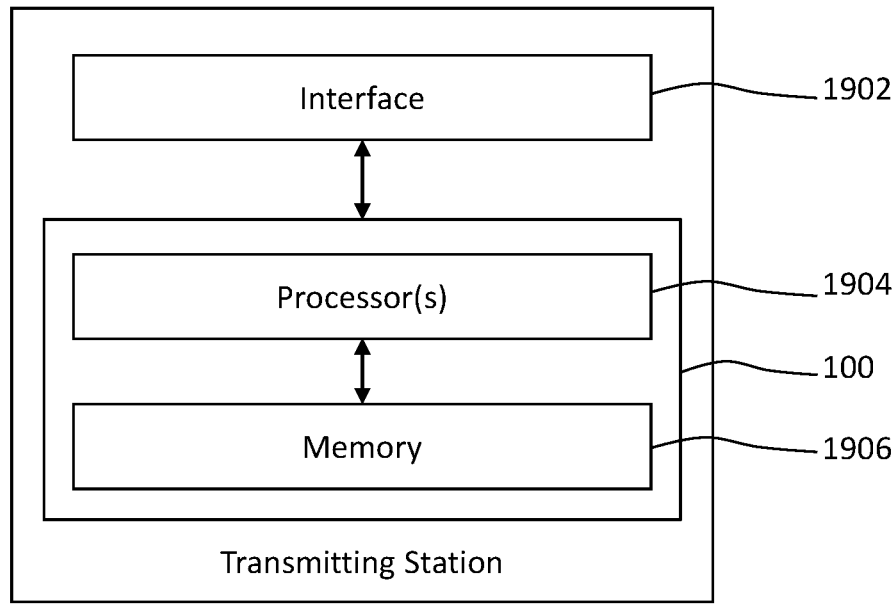
FIG. 19 shows a schematic block diagram of a transmitting station embodying the device of FIG. 1.

FIG. 19 shows a schematic block diagram for an embodiment of the device 100. The device 100 comprises one or more processors 1904 for performing the method 300 and memory 1906 coupled to the processors 1904. For example, the memory 1906 may be encoded with instructions that implement at least one of the modules 102, 104 and 106.

The one or more processors 1904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1906, transmitter functionality. For example, the one or more processors 1904 may execute instructions stored in the memory 1906. Such functionality may include providing various features and steps discussed herein, including any of the benefits disclosed herein. The expression "the device being operative to perform an action" may denote the device 100 being configured to perform the action.

As schematically illustrated in FIG. 19, the device 100 may be embodied by a transmitting station 1900, e.g., functioning as a transmitting base station or a transmitting UE. The transmitting station 1900 comprises a radio interface 1902 coupled to the device 100 for radio communication with one or more receiving stations, e.g., functioning as a receiving base station or a receiving UE.

Figure 20:
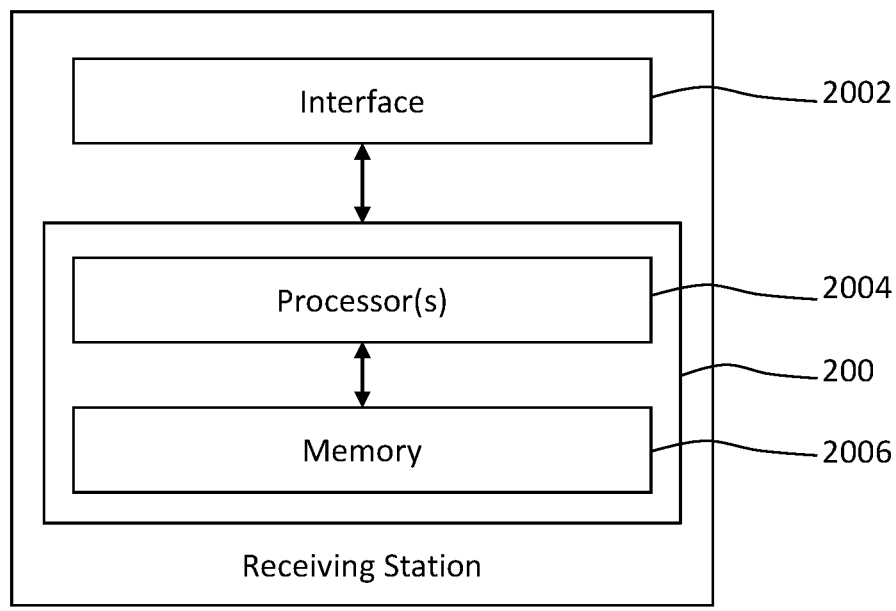
FIG. 20 shows a schematic block diagram of a receiving station embodying the device of FIG. 2.

FIG. 20 shows a schematic block diagram for an embodiment of the device 200. The device 200 comprises one or more processors 2004 for performing the method 400 and memory 2006 coupled to the processors 2004. For example, the memory 2006 may be encoded with instructions that implement at least one of the modules 202, 204 and 206.

The one or more processors 2004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 200, such as the memory 2006, receiver functionality. For example, the one or more processors 2004 may execute instructions stored in the memory 2006. Such functionality may include providing various features and steps discussed herein, including any of the benefits disclosed herein. The expression "the device being operative to perform an action" may denote the device 200 being configured to perform the action.

As schematically illustrated in FIG. 20, the device 200 may be embodied by a receiving station 2000, e.g., functioning as a receiving base station or a receiving UE. The receiving station 2000 comprises a radio interface 2002 coupled to the device 200 for radio communication with one or more transmitting stations, e.g., functioning as a transmitting base station or a transmitting UE.

Figure 21:
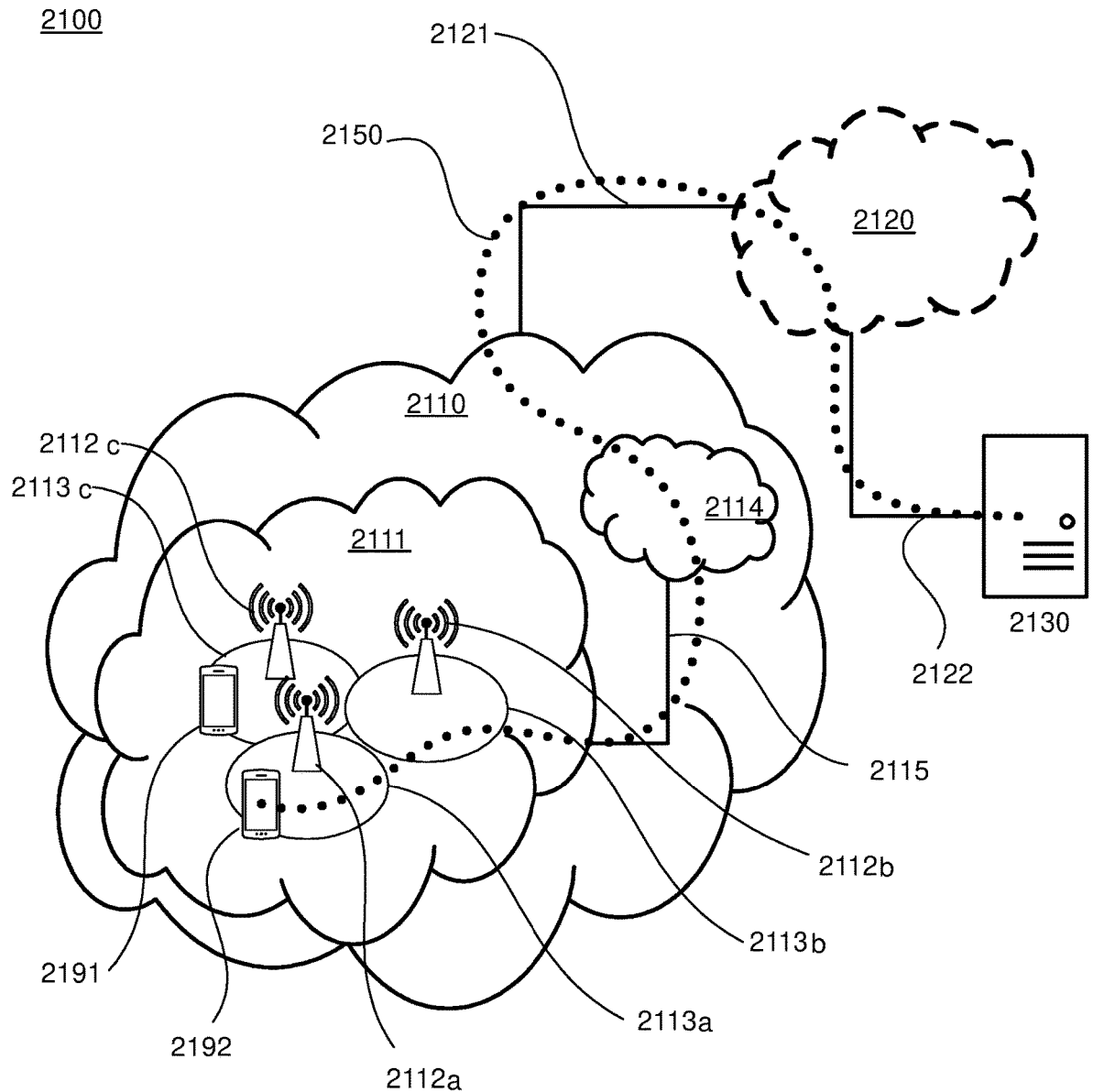
FIG. 21 schematically illustrates an example telecommunication network connected via an intermediate network to a host computer.

With reference to FIG. 21, in accordance with an embodiment, a communication system 2100 includes a telecommunication network 2110, such as a 3GPP-type cellular network, which comprises an access network 2111, such as a radio access network, and a core network 2114. The access network 2111 comprises a plurality of base stations 2112a, 2112b, 2112c, such as NBs, eNBs, gNBs or other types of wireless access points, each defining a corresponding coverage area 2113a, 2113b, 2113c. Each base station 2112a, 2112b, 2112c is connectable to the core network 2114 over a wired or wireless connection 2115. A first user equipment (UE) 2191 located in coverage area 2113c is configured to wirelessly connect to, or be paged by, the corresponding base station 2112c. A second UE 2192 in coverage area 2113a is wirelessly connectable to the corresponding base station 2112a. While a plurality of UEs 2191, 2192 are illustrated in this example, the disclosed embodiments are equally applicable to a situation where a sole UE is in the coverage area or where a sole UE is connecting to the corresponding base station 2112.

Any of the base stations 2112 and the UEs 2191, 2192 may embody the device 100.

The telecommunication network 2110 is itself connected to a host computer 2130, which may be embodied in the hardware and/or software of a standalone server, a cloud-implemented server, a distributed server or as processing resources in a server farm. The host computer 2130 may be under the ownership or control of a service provider, or may be operated by the service provider or on behalf of the service provider. The connections 2121, 2122 between the telecommunication network 2110 and the host computer 2130 may extend directly from the core network 2114 to the host computer 2130 or may go via an optional intermediate network 2120. The intermediate network 2120 may be one of, or a combination of more than one of, a public, private or hosted network; the intermediate network 2120, if any, may be a backbone network or the Internet; in particular, the intermediate network 2120 may comprise two or more sub-networks (not shown).

The communication system 2100 of FIG. 21 as a whole enables connectivity between one of the connected UEs 2191, 2192 and the host computer 2130. The connectivity may be described as an over-the-top (OTT) connection 2150. The host computer 2130 and the connected UEs 2191, 2192 are configured to communicate data and/or signaling via the OTT connection 2150, using the access network 2111, the core network 2114, any intermediate network 2120 and possible further infrastructure (not shown) as intermediaries. The OTT connection 2150 may be transparent in the sense that the participating communication devices through which the OTT connection 2150 passes are unaware of routing of uplink and downlink communications. For example, a base station 2112 need not be informed about the past routing of an incoming downlink communication with data originating from a host computer 2130 to be forwarded (e.g., handed over) to a connected UE 2191. Similarly, the base station 2112 need not be aware of the future routing of an outgoing uplink communication originating from the UE 2191 towards the host computer 2130.

By virtue of the method 200 being performed by any one of the UEs 2191 or 2192 and/or any one of the base stations 2112, the performance of the OTT connection 2150 can be improved, e.g., in terms of increased throughput and/or reduced latency. More specifically, the host computer 2130 may indicate the AC 302 for the user data being a piece of the data in the multi-layer transmission 208.

Example implementations, in accordance with an embodiment of the UE, base station and host computer discussed in the preceding paragraphs, will now be described with reference to FIG. 22. In a communication system 2200, a host computer 2210 comprises hardware 2215 including a communication interface 2216 configured to set up and maintain a wired or wireless connection with an interface of a different communication device of the communication system 2200. The host computer 2210 further comprises processing circuitry 2218, which may have storage and/or processing capabilities. In particular, the processing circuitry 2218 may comprise one or more programmable processors, application-specific integrated circuits, field programmable gate arrays or combinations of these (not shown) adapted to execute instructions. The host computer 2210 further comprises software 2211, which is stored in or accessible by the host computer 2210 and executable by the processing circuitry 2218. The software 2211 includes a host application 2212. The host application 2212 may be operable to provide a service to a remote user, such as a UE 2230 connecting via an OTT connection 2250 terminating at the UE 2230 and the host computer 2210. In providing the service to the remote user, the host application 2212 may provide user data, which is transmitted using the OTT connection 2250. The user data may depend on the location of the UE 2230. The user data may comprise auxiliary information or precision advertisements (also: ads) delivered to the UE 2230. The location may be reported by the UE 2230 to the host computer, e.g., using the OTT connection 2250, and/or by the base station 2220, e.g., using a connection 2260.

The communication system 2200 further includes a base station 2220 provided in a telecommunication system and comprising hardware 2225 enabling it to communicate with the host computer 2210 and with the UE 2230. The hardware 2225 may include a communication interface 2226 for setting up and maintaining a wired or wireless connection with an interface of a different communication device of the communication system 2200, as well as a radio interface 2227 for setting up and maintaining at least a wireless connection 2270 with a UE 2230 located in a coverage area (not shown in FIG. 22) served by the base station 2220. The communication interface 2226 may be configured to facilitate a connection 2260 to the host computer 2210. The connection 2260 may be direct, or it may pass through a core network (not shown in FIG. 22) of the telecommunication system and/or through one or more intermediate networks outside the telecommunication system. In the embodiment shown, the hardware 2225 of the base station 2220 further includes processing circuitry 2228, which may comprise one or more programmable processors, application-specific integrated circuits, field programmable gate arrays or combinations of these (not shown) adapted to execute instructions. The base station 2220 further has software 2221 stored internally or accessible via an external connection.

The communication system 2200 further includes the UE 2230 already referred to. Its hardware 2235 may include a radio interface 2237 configured to set up and maintain a wireless connection 2270 with a base station serving a coverage area in which the UE 2230 is currently located. The hardware 2235 of the UE 2230 further includes processing circuitry 2238, which may comprise one or more programmable processors, application-specific integrated circuits, field programmable gate arrays or combinations of these (not shown) adapted to execute instructions. The UE 2230 further comprises software 2231, which is stored in or accessible by the UE 2230 and executable by the processing circuitry 2238. The software 2231 includes a client application 2232. The client application 2232 may be operable to provide a service to a human or non-human user via the UE 2230, with the support of the host computer 2210. In the host computer 2210, an executing host application 2212 may communicate with the executing client application 2232 via the OTT connection 2250 terminating at the UE 2230 and the host computer 2210. In providing the service to the user, the client application 2232 may receive request data from the host application 2212 and provide user data in response to the request data. The OTT connection 2250 may transfer both the request data and the user data. The client application 2232 may interact with the user to generate the user data that it provides.

Figure 22:
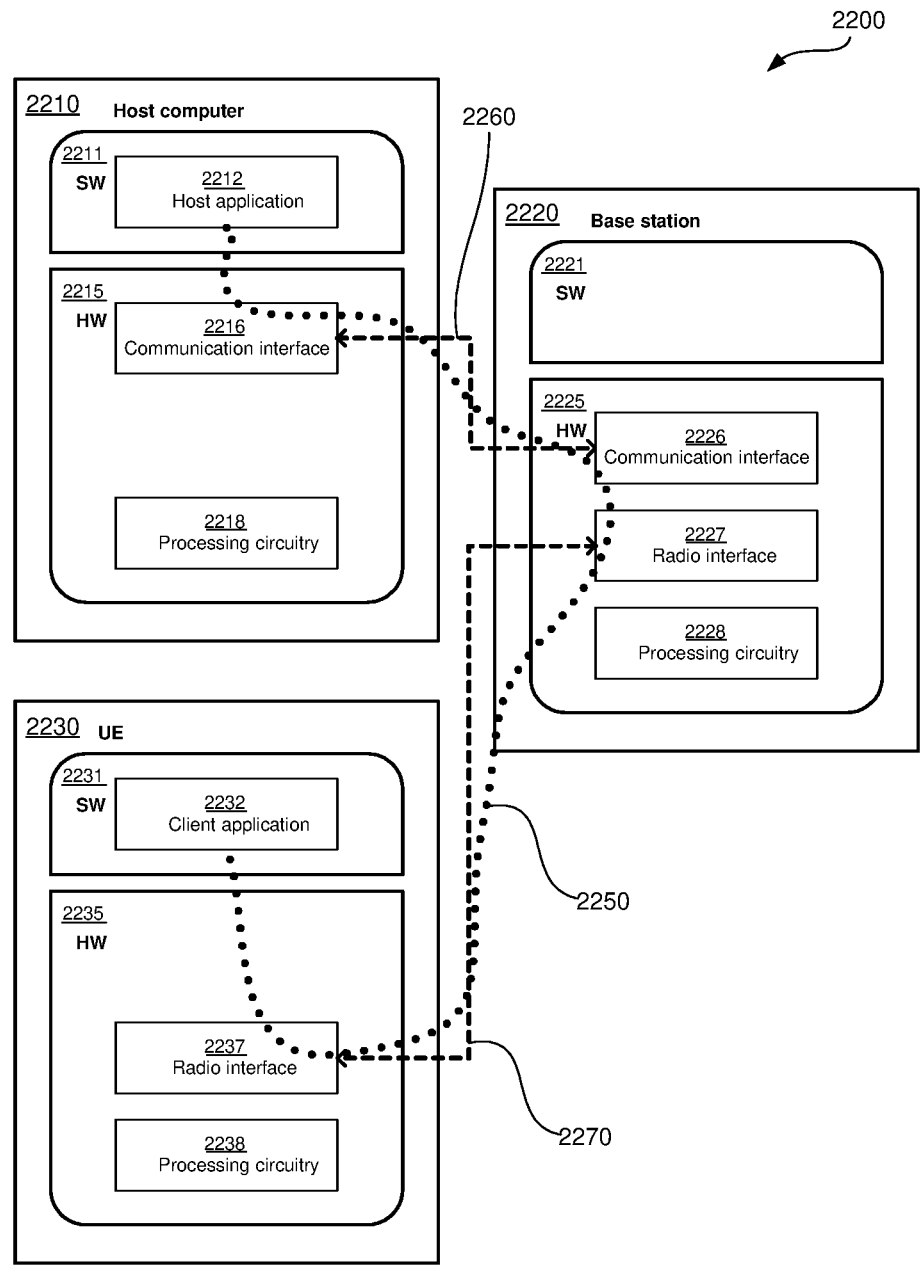
FIG. 22 shows a generalized block diagram of a host computer communicating via a base station or radio device functioning as a gateway with a user equipment over a partially wireless connection.

It is noted that the host computer 2210, base station 2220 and UE 2230 illustrated in FIG. 22 may be identical to the host computer 2130, one of the base stations 2112a, 2112b, 2112c and one of the UEs 2191, 2192 of FIG. 21, respectively. This is to say, the inner workings of these entities may be as shown in FIG. 22, and, independently, the surrounding network topology may be that of FIG. 21.

In FIG. 22, the OTT connection 2250 has been drawn abstractly to illustrate the communication between the host computer 2210 and the UE 2230 via the base station 2220, without explicit reference to any intermediary devices and the precise routing of messages via these devices. Network infrastructure may determine the routing, which it may be configured to hide from the UE 2230 or from the service provider operating the host computer 2210, or both. While the OTT connection 2250 is active, the network infrastructure may further take decisions by which it dynamically changes the routing (e.g., on the basis of load balancing consideration or reconfiguration of the network).

The wireless connection 2270 between the UE 2230 and the base station 2220 is in accordance with the teachings of the embodiments described throughout this disclosure. One or more of the various embodiments improve the performance of OTT services provided to the UE 2230 using the OTT connection 2250, in which the wireless connection 2270 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 2250 between the host computer 2210 and UE 2230, in response to variations in the measurement results. The measurement procedure and/or the network functionality for reconfiguring the OTT connection 2250 may be implemented in the software 2211 of the host computer 2210 or in the software 2231 of the UE 2230, or both. In embodiments, sensors (not shown) may be deployed in or in association with communication devices through which the OTT connection 2250 passes; the sensors may participate in the measurement procedure by supplying values of the monitored quantities exemplified above, or supplying values of other physical quantities from which software 2211, 2231 may compute or estimate the monitored quantities. The reconfiguring of the OTT connection 2250 may include message format, retransmission settings, preferred routing etc.; the reconfiguring need not affect the base station 2220, and it may be unknown or imperceptible to the base station 2220. Such procedures and functionalities may be known and practiced in the art. In certain embodiments, measurements may involve proprietary UE signaling facilitating the host computer's 2210 measurements of throughput, propagation times, latency and the like. The measurements may be implemented in that the software 2211, 2231 causes messages to be transmitted, in particular empty or "dummy" messages, using the OTT connection 2250 while it monitors propagation times, errors etc.

Figures 23, 24:
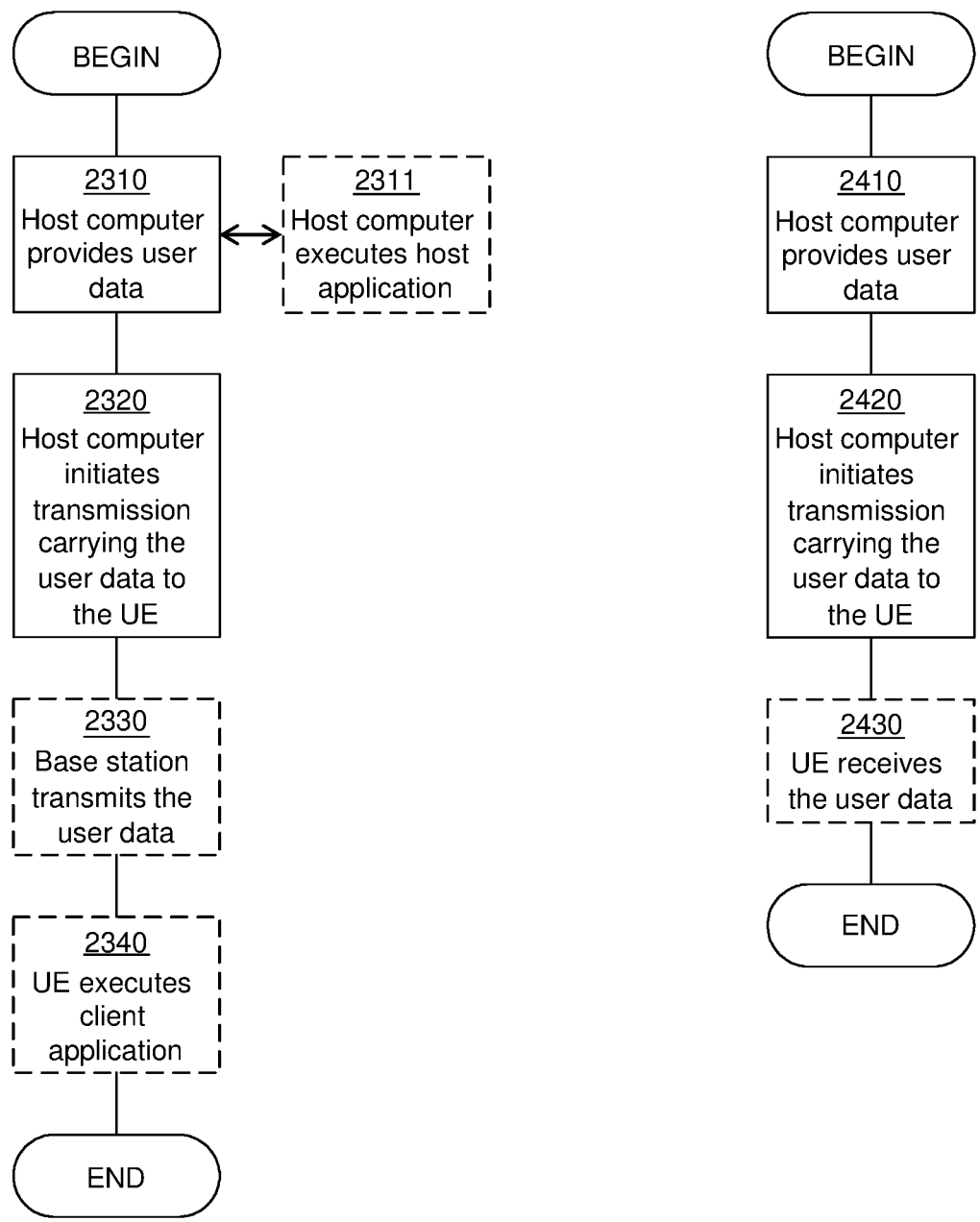
FIGS. 23 and 24 show flowcharts for methods implemented in a communication system including a host computer, a base station or radio device functioning as a gateway and a user equipment.

FIG. 23 is a flowchart illustrating a method implemented in a communication system, in accordance with one embodiment. The communication system includes a host computer, a base station and a UE, which may be those described with reference to FIGS. 21 and 22. For simplicity of the present disclosure, only drawing references to FIG. 23 will be included in this paragraph. In a first step 2310 of the method, the host computer provides user data. In an optional substep 2311 of the first step 2310, the host computer provides the user data by executing a host application. In a second step 2320, the host computer initiates a transmission carrying the user data to the UE. In an optional third step 2330, the base station transmits to the UE the user data which was carried in the transmission that the host computer initiated, in accordance with the teachings of the embodiments described throughout this disclosure. In an optional fourth step 2340, the UE executes a client application associated with the host application executed by the host computer.

FIG. 24 is a flowchart illustrating a method implemented in a communication system, in accordance with one embodiment. The communication system includes a host computer, a base station and a UE, which may be those described with reference to FIGS. 21 and 22. For simplicity of the present disclosure, only drawing references to FIG. 24 will be included in this paragraph. In a first step 2410 of the method, the host computer provides user data. In an optional substep (not shown) the host computer provides the user data by executing a host application. In a second step 2420, the host computer initiates a transmission carrying the user data to the UE. The transmission may pass via the base station, in accordance with the teachings of the embodiments described throughout this disclosure. In an optional third step 2430, the UE receives the user data carried in the transmission.

In any embodiment, data may be transmitted from one transmitter to one receiver. The data may be transmitted using multiple layers, wherein the robustnesses of the different layers are pairwise different. This difference in robustness may be taken into account for selecting what data to transmit on which of the multiple layers. Furthermore, the multi-layer transmission uses HARQ for at least one of the layers.

When selecting parameters for the multi-layer transmission information related to whether a layer carries new data or retransmitted data is taken into account.

When a layer is to be used for retransmission of data, the data carried by the layer used for the retransmission is selected based on how much additional information is expected to be needed to result in that the data can be correctly decoded at the receiver.

The receiver may receive data transmitted on at least one layer of a multi-layer transmission using HARQ. Upon trying to decode the received data, the receiver may generate at least one parameter (also: metric, e.g., in the feedback message) representative of how far from successful the receiver is.

The parameter may correspond to a number of additional bits that are needed by the receiver. Alternatively or in addition, the parameter may correspond to a SNR value needed for a received signal encoded with the retransmitted data. Alternatively or in addition, the parameter may correspond to a specific layer to be used when retransmitting the respective data. Alternatively or in addition, the parameter may correspond to a control parameter for controlling the robustnesses of the layers in a non-uniform constellation. Alternatively or in addition, the parameter may correspond to the number of layers.

The technique may be implemented as a coded system. By way of example, a data packet may comprise a plurality of coded modulation symbols, e.g., on the order of 1000 modulation symbols. Each modulation symbol may result from a combination of multiple (e.g., two, three or more) partial modulation symbols. Each modulation symbol may have multiple (e.g., two, three or more) layers, e.g., in one-to-one correspondence with the multiple partial modulation symbols.

Furthermore, multi-layer modulation parameters may be selected. The performance of the more robust layers (e.g., the layer associated with the second least power level) can become worse if additional layers are added. Thus, it may be important to not use too many layers. The technique may be implemented to control the parameters of the multi-layer modulation (particularly, the number of layers), e.g., resulting in improved reliability and/or throughput of the data transmission.

As has become apparent from above description, embodiments of the technique allow for improved spectrum efficiency and reduced delay at a very low additional complexity. The invention is particularly suitable for operation in unlicensed bands where it can be expected that the receiver conditions are highly varying and therefore hard to predict.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of performing a multi-layer transmission from a transmitting station to a receiving station on a radio frequency, the multi-layer transmission comprising multiple layers having different robustnesses on the radio frequency, the method comprising:
    transmitting first data of a first hybrid automatic repeat request (HARQ) process on a first layer of the multi-layer transmission simultaneously with second data of a second HARQ process on a second layer of the multi-layer transmission;
    receiving a feedback message from the receiving station in response to the transmission, wherein the feedback message is indicative of a signal to noise ratio (SNR) or a signal to interference and noise ratio (SINR);
    assigning a first portion of a mutual information between the transmitting station and the receiving station to the first layer and/or assigning a second portion of the mutual information to the second layer, wherein the portions of the mutual information are estimated based on the indicated SNR or SINR to correspond to the amount of information that is missing to successfully decode at least one or each of the first data and the second data.

2. The method of claim 1, further comprising:
    controlling the robustnesses of the multiple layers by assigning a first portion of a mutual information between the transmitting station and the receiving station to the first layer and assigning a second portion of the mutual information to the second layer.

3. The method of claim 1, wherein the robustnesses of the different layers are controlled by at least one parameter of a modulation and coding scheme.

4. The method of claim 1, wherein the first layer is related to an in-phase component and the second layer is related to a quadrature component, or vice versa, in the multi-layer transmission.

5. The method of claim 1:
further comprising mapping, if the feedback message is indicative that decoding of the first data was not successful by an amount of missing information, the first data to one of the layers in a further transmission;
wherein a portion of mutual information carried by the one layer in the further transmission is greater than the indicated amount of missing information.

6. The method of claim 5, wherein the first data is mapped to the one layer having the least robustness or the least portion of mutual information among the layers carrying a portion of mutual information greater than the indicated amount of missing information.

7. The method of claim 1:
wherein the feedback message is indicative of a positive acknowledgment for the second data and not a positive acknowledgment for the first data;
wherein the method further comprises transmitting, to the receiving station and in response to the feedback message, the first data of the first HARQ process on the second layer simultaneously with third data transmitted on the first layer, or vice versa.

8. The method of claim 1, further comprising transmitting, in response to the feedback message indicating that decoding of the first data was not successful, the first data on the second layer if the portion of mutual information carried by the second layer is sufficient for successfully decoding the first data.

9. The method of claim 1, wherein the multi-layer transmission on the radio frequency is subject to an access protocol for shared access to the radio frequency; the access protocol comprising a back-off mechanism for deferring the multi-layer transmission based on a contention window, which is maintained or not increased if the feedback message from the receiving station is indicative of a positive acknowledgement for at least one of the first data and the second data.

10. A transmit device for performing a multi-layer transmission from a transmitting station to a receiving station on a radio frequency, the multi-layer transmission comprising multiple layers having different robustnesses on the radio frequency, the transmit device comprising:
processing circuitry;
memory containing instructions executable by the processing circuitry whereby the transmit device is operative to:
transmit first data of a first hybrid automatic repeat request (HARQ) process on a first layer of the multi-layer transmission simultaneously with second data of a second HARQ process on a second layer of the multi-layer transmission;
receive a feedback message from the receiving station in response to the transmission, wherein the feedback message is indicative of a signal to noise ratio (SNR) or a signal to interference and noise ratio (SINR); and
assign a first portion of a mutual information between the transmitting station and the receiving station to the first layer and/or assigning a second portion of the mutual information to the second layer, wherein the portions of the mutual information are estimated based on the indicated SNR or SINR to correspond to the amount of information that is missing to successfully decode at least one or each of the first data and the second data.

11. A method of performing a multi-layer reception from a transmitting station at a receiving station on a radio frequency, the multi-layer reception comprising multiple layers having different robustnesses on the radio frequency, the method comprising:
receiving first data of a first hybrid automatic repeat request (HARQ) process on a first layer of the multi-layer reception, the first layer being assigned a first portion of a mutual information between the transmitting station and the receiving station simultaneously with second data of a second HARQ process on a second layer of the multi-layer reception, the second layer being assigning a second portion of the mutual information;
transmitting a feedback message to the transmitting station in response to the reception, wherein the feedback message is indicative of a signal to noise ratio (SNR) or a signal to interference and noise ratio (SINR).

12. The method of claim 11, wherein the robustnesses of the different layers are controlled by at least one parameter of a modulation and coding scheme.

13. The method of claim 11, wherein the first layer is related to an in-phase component and the second layer is related to a quadrature component, or vice versa, in the multi-layer reception.

14. The method of claim 11, further comprising, in response to the feedback message indicating that decoding of the first data was not successful by an amount of missing information, receiving the first data on one of the layers in a further reception; wherein a portion of mutual information carried by the one layer in the further reception is greater than the indicated amount of missing information.

15. The method of claim 11:
wherein the feedback message is indicative of a positive acknowledgment for the second data and not a positive acknowledgment for the first data;
wherein the method further comprises receiving, from the transmitting station and in response to the feedback message, the first data of the first HARQ process.

16. The method of claim 11, further comprising, in response to the feedback message indicating that decoding of the first data was not successful, transmitting the first data on the second layer if the portion of mutual information carried by the second layer is sufficient for successfully decoding the first data.

17. The method of claim 11, wherein the multi-layer transmission on the radio frequency is subject to an access protocol for shared access to the radio frequency; the access protocol comprising a back-off mechanism for deferring the multi-layer reception based on a contention window, which is maintained or not increased if the feedback message to the transmitting station is indicative of a positive acknowledgement for at least one of the first data and the second data.

18. The method of claim 11:
wherein multiple codewords for the multiple layers, respectively, are encoded;
decoding each codeword; wherein for the decoding, when at least one of the codewords is decoded successfully, soft values for the one or more other codewords are computed using the successfully decoded codeword as additional information.

19. A receive device for performing a multi-layer reception from a transmitting station at a receiving station on a radio frequency, the multi-layer reception comprising multiple layers having different robustnesses on the radio frequency, the receive device comprising:
  processing circuitry;
  memory containing instructions executable by the processing circuitry whereby the receive device is operative to:
    receive first data of a first hybrid automatic repeat request (HARQ) process on a first layer of the multi-layer reception, the first layer being assigned a first portion of a mutual information between the transmitting station and the receiving station simultaneously with second data of a second HARQ process on a second layer of the multi-layer reception, the second layer being assigning a second portion of the mutual information; and
    transmit a feedback message to the transmitting station in response to the reception, wherein the feedback message is indicative of a signal to noise ratio (SNR) or a signal to interference and noise ratio (SINR).

* * * * *